(12) United States Patent
Doeweling et al.

(10) Patent No.: US 9,992,622 B2
(45) Date of Patent: Jun. 5, 2018

(54) ARCHITECTURE FOR INDOOR LOCATION TRACKING

(71) Applicant: SAP SE, Walldorf (DE)

(72) Inventors: Sebastian Doeweling, Griesheim (DE); Marcus Dombois, Giessen (DE)

(73) Assignee: SAP SE, Walldorf (DE)

( * ) Notice: Subject to any disclaimer, the term of this patent is extended or adjusted under 35 U.S.C. 154(b) by 0 days. days.

(21) Appl. No.: 15/228,675

(22) Filed: Aug. 4, 2016

(65) Prior Publication Data

US 2018/0041866 A1   Feb. 8, 2018

(51) Int. Cl.
*H04W 24/00* (2009.01)
*H04W 4/02* (2018.01)
*G06F 17/30* (2006.01)
*H04W 4/00* (2018.01)

(52) U.S. Cl.
CPC ...... *H04W 4/023* (2013.01); *G06F 17/30241* (2013.01); *G06F 17/30867* (2013.01); *H04W 4/008* (2013.01)

(58) Field of Classification Search
CPC ..... H04W 40/24; H04W 64/00; H04W 84/18; H04W 4/008
See application file for complete search history.

(56) References Cited

U.S. PATENT DOCUMENTS

| 2007/0005306 A1* | 1/2007 | Foessel ............ G01S 13/723 702/189 |
| 2010/0148940 A1* | 6/2010 | Gelvin ............... H04L 67/12 340/286.02 |
| 2010/0310258 A1* | 12/2010 | Wang ............. H04Q 11/0062 398/115 |
| 2011/0032896 A1* | 2/2011 | Cubic ................ H04L 12/24 370/329 |

OTHER PUBLICATIONS fipple Inc. Getting Started with iBeacon, 2014, 1-11.
Apple Inc. Proximity Beacon Specification—Release R1, 2015, 1-10.
(Continued)

*Primary Examiner* — Khalid Shaheed
*Assistant Examiner* — K Wilford
(74) *Attorney, Agent, or Firm* — Fountainhead Law Group P.C.

(57) ABSTRACT

Some embodiments provide a program that receives, from a first sensor, a first set of sensor data that the first sensor detects from a first set of signal-transmitting devices. The program receives, from a second sensor, a second set of sensor data that the second sensor detects from a second set of signal-transmitting devices. The program processes the first set of sensor data to determine a first set of potential locations and a corresponding first set of location metrics associated with the first set of potential locations. The program processes the second set of sensor data to determine a second set of potential locations and a corresponding second set of location metrics associated with the second set of potential locations. The program identifies a location from the first and second sets of potential locations as a location of the device based on the first and second sets of location metrics.

15 Claims, 13 Drawing Sheets

(56) References Cited

OTHER PUBLICATIONS

Baniukevic, A., Jensen, C.S. and Hua, L., Hybrid Indoor Positioning with Wi-Fi and Bluetooth: Architecture and Performance. in IEEE 14th International Conference on Mobile Data Management (MDM), (2013), 207-216.

Baniukevic, A., Sabonis, D., Jensen, C.S. and Hua, L, Improving Wi-Fi Based Indoor Positioning Using Bluetooth Add-Ons. in 12th IEEE International Conference on Mobile Data Management (MDM), (2011), 246-255.

Faragher, R. and Harle, R., An Analysis of the Accuracy of Bluetooth Low Energy for Indoor Positioning Applications. in Proceedings of the 27th International Technical Meeting of the Satellite Division of the Institute of Navigation (ION GNSS+ 2014), (Tampa, Florida, 2014), 201-210.

Henniges, R., Current approaches of Wi-Fi positioning. in Servicecentric Networking Seminar WS2011/2012, Tuberlin, (2012).

Hilsenbeck, S., Bobkov, D., Schroth, G., Huitl, R. And Steinbach, E. Graph-based data fusion of pedometer and WiFi measurements for mobile indoor positioning Proceedings of the 2014 ACM International Joint Conference on Pervasive and Ubiquitous Computing, ACM, Seattle, Washington, 2014, 147-158.

La Delfa, G.C. and Catania, V., Accurate indoor navigation using smartphone, bluetooth low energy and visual tags. in Proceedings of the 2nd Conference on Mobile and Information Technologies in Medicine, (2014).

Lee, J.-Y., Yoon, C.-H., Hyunjae, P. and So, J., Analysis of location estimation algorithms for wifi fingerprint-based indoor localization. in the 2nd international conference on software technology, (2013), 89-92.

Lyu-Han, C., Wu, E.H.K., Ming-Hui, J. and Gen-Huey, C. Intelligent Fusion of Wi-Fi and Inertial Sensor-Based Positioning Systems for Indoor Pedestrian Navigation. Sensors Journal, IEEE, 14 (11). 4034-4042.

Qian, D. and Dargie, W., Evaluation of the reliability of RSSI for indoor localization. in Wireless Communications in Unusual and Confined Areas (ICWCUCA), 2012 International Conference on, (2012), 1-6.

Radu, V. and Marina, M.K., HiMLoc: Indoor smartphone localization via activity aware Pedestrian Dead Reckoning with selective crowdsourced WiFi fingerprinting. in Indoor Positioning and Indoor Navigation (IPIN), 2013 International Conference on, (2013), 1-10.

Shala, U. Aand Rodriguez, A. Indoor Positioning using Sensor-fusion in Android Devices. Kristianstad University, Computer Science Department, 2011.

Shang, J., Hu, X., Gu, F., Wang, D. and Yu, S. Improvement Schemes for Indoor Mobile Location Estimation: A Survey. Mathematical Problems in Engineering, 2015. 32.

Shuai, H., Cong, Z., Weixiao, M. and Cheng, L., Cosine similarity based fingerprinting algorithm in WLAN indoor positioning against device diversity. in Communications (ICC), 2015 IEEE International Conference on, (2015), 2710-2714.

Zhang, A., Yuan, Y., Wu, Q., Zhu, S. and Deng, J. Wireless Localization Based on RSSI Fingerprint Feature Vector. International Journal of Distributed Sensor Networks, 2015.

\* cited by examiner

| Reference Location | Sensor Signal of Device 305 | Sensor Signal of Device 310 | Sensor Signal of Device 315 | Sensor Signal of Device 320 | Sensor Signal of Device 325 |
|---|---|---|---|---|---|
| 330 | -30 dBm | -45 dBm | -62 dBm | -70 dBm | -75 dBm |
| 335 | -40 dBm | -35 dBm | -52 dBm | -63 dBm | -65 dBm |
| 340 | -50 dBm | -35 dBm | -42 dBm | -44 dBm | -55 dBm |
| 345 | -60 dBm | -45 dBm | -32 dBm | -43 dBm | -45 dBm |
| 350 | -70 dBm | -55 dBm | -40 dBm | -44 dBm | -40 dBm |
| 355 | -72 dBm | -57 dBm | -40 dBm | -41 dBm | -43 dBm |
| 360 | -74 dBm | -59 dBm | -43 dBm | -38 dBm | -46 dBm |
| 365 | -76 dBm | -61 dBm | -46 dBm | -35 dBm | -49 dBm |

ARCHITECTURE FOR INDOOR LOCATION TRACKING

BACKGROUND

With the wide availability of GPS sensors in modern devices (e.g., smartphones) and readily available location services on major smartphone platforms, location-awareness has become a common feature of both business and consumer applications. These services typically provides reliable results when the device is outdoors and unreliable results when the device is indoors. For better indoor tracking, a Wi-Fi infrastructure or a Bluetooth infrastructure may be leveraged. In some cases, the infrastructure may still not provide reliable indoor tracking (e.g., a building may have a few Wi-Fi access points that provide little coverage throughout the building).

SUMMARY

In some embodiments, a non-transitory machine-readable medium stores a program executable by at least one processing unit of a device. The program receives, from a first sensor, a first set of sensor data that the first sensor detects from a first set of signal-transmitting devices. The program also receives, from a second sensor, a second set of sensor data that the second sensor detects from a second set of signal-transmitting devices. The program further processes the first set of sensor data to determine a first set of potential locations and a corresponding first set of location metrics associated with the first set of potential locations. The program also processes the second set of sensor data to determine a second set of potential locations and a corresponding second set of location metrics associated with the second set of potential locations. The program further identifies a location from the first and second sets of potential locations as a location of the device based on the first and second sets of location metrics.

In some embodiments, the program further filters the first and second sets of sensor data. The program may also perform smoothing operations on the first and second sets of sensor data. In some embodiments, the location metrics associated with the first set of potential locations may be determined based on reference data associated with a plurality of reference locations. The identified location may have a location metric representing a closest distance to a reference location in the plurality reference locations.

In some embodiments, identifying the location from the first and second sets of potential locations includes determining a mode of the first and second sets of potential locations. The program may further receive, from a third sensor, a third set of sensor data that the third sensor detects from a third set of signal-transmitting devices. The program may also process the third set of sensor data to determine a third set of potential locations and a corresponding third set of location metrics associated with the third set of potential locations. The identification may include identifying the location from the first, second, and third sets of potential locations as the location of the device based on the first, second, and third sets of location metrics. In some embodiments, the program displays the identified location on a display of the device.

In some embodiments, a method receives, from a first sensor, a first set of sensor data that the first sensor detects from a first set of signal-transmitting devices. The method also receives, from a second sensor, a second set of sensor data that the second sensor detects from a second set of signal-transmitting devices. The method further processes the first set of sensor data to determine a first set of potential locations and a corresponding first set of location metrics associated with the first set of potential locations. The method also processes the second set of sensor data to determine a second set of potential locations and a corresponding second set of location metrics associated with the second set of potential locations. The method further identifies a location from the first and second sets of potential locations as a location of the device based on the first and second sets of location metrics.

In some embodiments, the method further filters the first and second sets of sensor data. The method also performs smoothing operations on the first and second sets of sensor data. In some embodiments, the location metrics associated with the first set of potential locations may be determined based on reference data associated with a plurality of reference locations. The identified location may have a location metric representing a closest distance to a reference location in the plurality reference locations.

In some embodiments, identifying the location from the first and second sets of potential locations includes determining a mode of the first and second sets of potential locations The method may further receive, from a third sensor, a third set of sensor data that the third sensor detects from a third set of signal-transmitting devices. The method may also process the third set of sensor data to determine a third set of potential locations and a corresponding third set of location metrics associated with the third set of potential locations. The identification may include identifying the location from the first, second, and third sets of potential locations as the location of the device based on the first, second, and third sets of location metrics. In some embodiments, the method displays the identified location on a display of the device.

In some embodiments, a system includes a set of processing units and a non-transitory computer-readable medium that stores instructions. The instructions cause at least one processing unit to receive, from a first sensor, a first set of sensor data that the first sensor detects from a first set of signal-transmitting devices. The instructions also cause the at least one processing unit to receive, from a second sensor, a second set of sensor data that the second sensor detects from a second set of signal-transmitting devices. The instructions further cause the at least one processing unit to process the first set of sensor data to determine a first set of potential locations and a corresponding first set of location metrics associated with the first set of potential locations. The instructions also cause the at least one processing unit to process the second set of sensor data to determine a second set of potential locations and a corresponding second set of location metrics associated with the second set of potential locations. The instructions further cause the at least one processing unit to identify a location from the first and second sets of potential locations as a location of the device based on the first and second sets of location metrics.

In some embodiments, the instructions further cause the at least one processing unit to filter the first and second sets of sensor data. The instructions also cause the at least one processing unit to perform smoothing operations on the first and second sets of sensor data. In some embodiments, the location metrics associated with the first set of potential locations may be determined based on reference data associated with a plurality of reference locations. The identified location may have a location metric representing a closest distance to a reference location in the plurality reference locations.

In some embodiments, identifying the location from the first and second sets of potential locations may include determining a mode of the first and second sets of potential locations. The instructions may further cause the at least one processing unit to receive, from a third sensor, a third set of sensor data that the third sensor detects from a third set of signal-transmitting devices. The instructions also cause the at least one processing unit to process the third set of sensor data to determine a third set of potential locations and a corresponding third set of location metrics associated with the third set of potential locations. The identification may include identifying the location from the first, second, and third sets of potential locations as the location of the device based on the first, second, and third sets of location metrics.

The following detailed description and accompanying drawings provide a better understanding of the nature and advantages of the present invention.

BRIEF DESCRIPTION OF THE DRAWINGS

FIG. 4 illustrates a table of example reference sensor signal values recorded at the reference locations illustrated in FIG. 3 according to some embodiments.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for determining the location of a mobile device based on sensor data from different sensors (e.g., a Wi-Fi sensor, a Bluetooth sensor, a global positioning system (GPS) sensor, etc.) of the mobile device. In some embodiments, the mobile device includes a flexible pipeline architecture for processing the sensor data. For instance, different pipelines may be configured to process sensor data from one or more sensors of the mobile device. Each pipeline may include a number of different processing components (e.g., a sensor module, a pre-processor, and a processor). In addition, the processing component of each pipeline may be configured in a variety of different configurations. The flexible pipeline architecture may determine the location of the mobile device based on the sensor data processed by the different pipelines.

Figure 1:
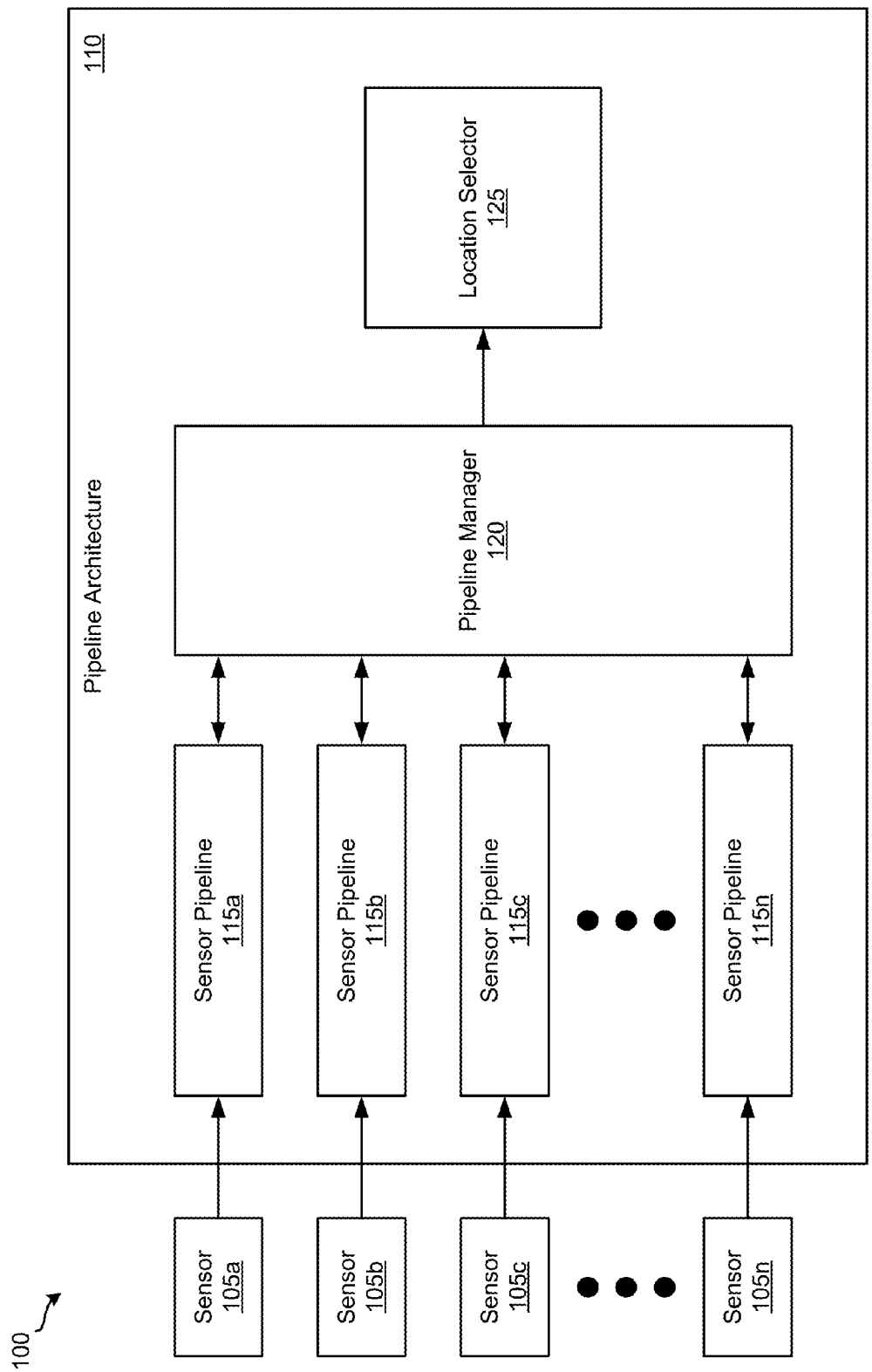
FIG. 1 illustrates a system that includes a pipeline architecture according to some embodiments.

FIG. 1 illustrates a system 100 that includes a pipeline architecture according to some embodiments. In some embodiments, system 100 may be implemented on a cellphone, a smartphone, a wearable device, an activity tracker or manager, a tablet, a personal digital assistant (PDA), a media player, or any other type of mobile computing device or combination thereof. In other embodiments, system 100 may be implemented on a desktop computer, a laptop, a server computer, or any other type of computer system or combination thereof.

As shown, system 100 includes sensors 105a-n and pipeline architecture 110. Sensors 105a-n may be hardware sensors included in the device on which system 100 is implemented. Examples of hardware sensors include a Wi-Fi sensor (e.g., a Wi-Fi transceiver configured to sense Wi-Fi signals), a Bluetooth sensor (e.g., a Bluetooth transceiver configured to sense Bluetooth signals), a GPS sensory (e.g., a GPS receiver configured to sense GPS signals), a cellular sensor (e.g., a cellular transceiver configured to sense cellular signals), an ultra-wideband (UWB) sensor (e.g., a UWB transceiver configured to sense UWB signals), a near-field communication (NFC) sensor (e.g., a NFC transceiver configured to sense NFC signals), a radio-frequency identification (RFID) sensor (e.g., an RFID transceiver configured to sense RFID signals), etc.

FIG. 1 also illustrates that pipeline architecture 110 includes sensor pipelines 115a-n, pipeline manager 120, and location selector 125. Sensor pipelines 115a-n are configured to process sensor data received from sensors 105a-n. For instance, a sensor pipeline may perform various filtering and/or smoothing operations on the sensor data. Based on the sensor data from a sensor 105, a sensor pipeline 115 determines a set of potential locations of a device on which system 100 is implemented and sends the set of potential locations to pipeline manager 120. A sensor pipeline 115 may be configured to use any number of different approaches and/or algorithms to calculate the set of potential locations.

Pipeline manager 120 is responsible for managing sensor pipelines 115a-n. In some embodiments, pipeline manager 120 configures and monitors sensor pipelines 115a-n. Examples of sensor pipeline configurations are illustrated in, and described below by reference to, FIGS. 2, 6, and 7. Pipeline manager 120 also handles the operation of sensor pipelines 115a-n. For example, pipeline manager 120 may receive sensor data from, and processed by, a component of a sensor pipeline 115 and subsequently pass the sensor data to another component in the sensor pipeline 115 for further processing. Once pipeline manager 120 receives a set of potential locations from a sensor pipeline 115, pipeline manager 120 forwards the set of potential locations to location selector 125.

Location selector 125 is configured to identify a location from the sets of potential locations determined by sensor pipelines 115a-n as the location of the device (also referred to as the device location). Location selector 125 may use any number of different techniques to identify the device location from the sets of potential locations. Examples of techniques will be described below. Once location selector 125 has identified the device location, pipeline architecture 110 may send the device location to a component of system 100 to use. For example, pipeline architecture 110 may send the determined location to a user interface (UI) component (not shown) of system 100 for the UI component to display the determined location on a display of a device on which system 100 is implemented.

Although FIG. 1 shows n number of sensors, one of ordinary skill in the art will understand that system 100 may include any number of different sensors in some embodiments. Furthermore, FIG. 1 shows each sensor pipeline 110 receiving sensor data from a sensor 105 for purposes of simplicity and explanation. One of ordinary skill in the art will appreciate that a sensor pipeline 110 may be configured in some embodiments to receive sensor data from multiple sensors 105. In some embodiments, multiple sensor pipelines 110 may be configured to receive sensor data from the same sensor 105.

Figure 2:
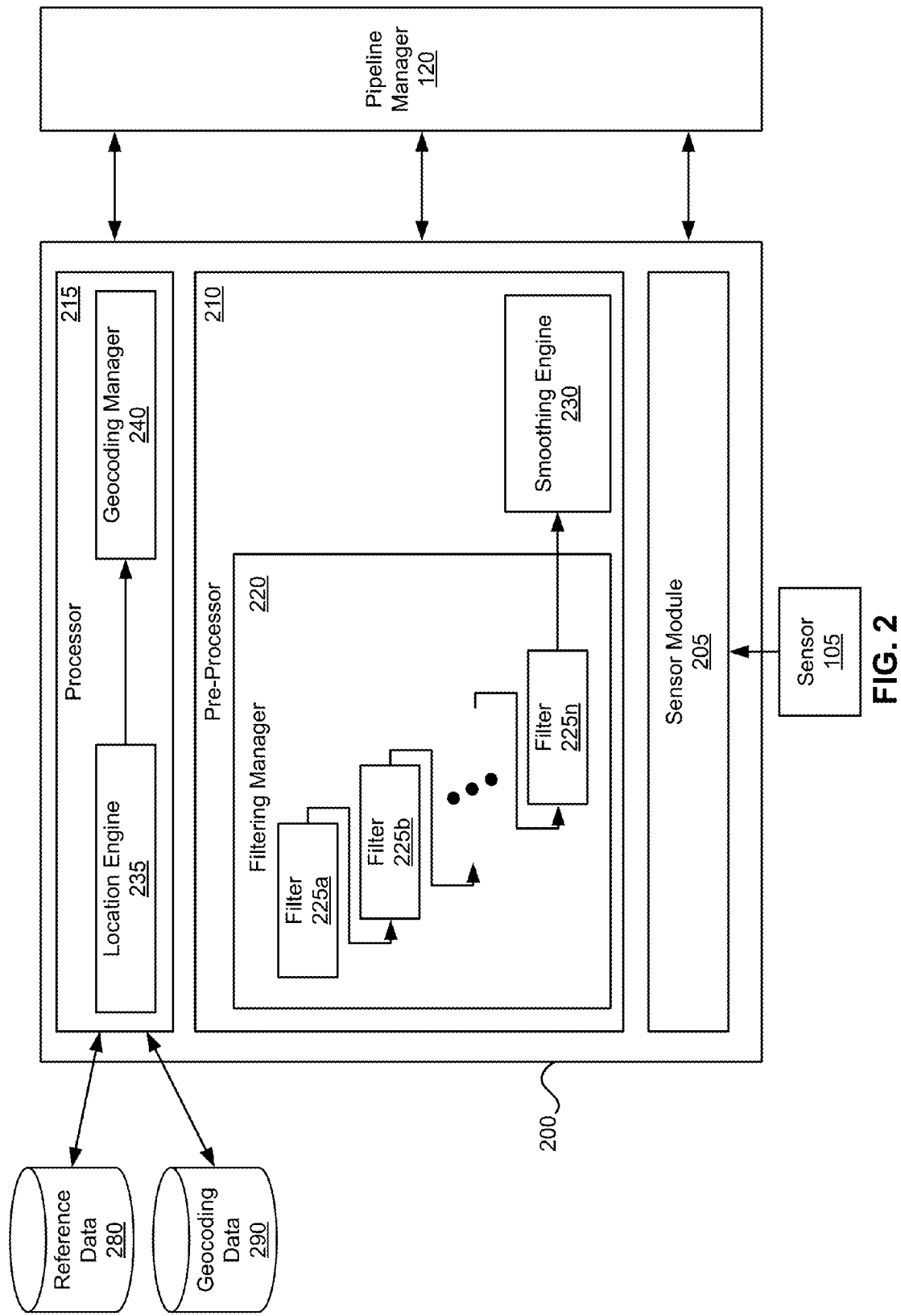
FIG. 2 illustrates a sensor pipeline according to some embodiments.

FIG. 2 illustrates a sensor pipeline 200 according to some embodiments. Sensor pipeline 200 may be used to implement any of the sensor pipelines 115*a-n* illustrated in FIG. 1. As shown, sensor pipeline 200 includes sensor module 205, pre-processor 210, and processor 215. Sensor module 205 is configured to control and manage sensor 105. For instance, sensor module 205 may instruct sensor 105 to perform periodic scans for sensor data. In some embodiments where sensor 105 is a Wi-Fi sensor, sensor module 205 may instruct sensor 105 to scan through different radio frequencies to determine signal strengths (e.g., received signal strength indicator (RSSI) values) from detected Wi-Fi access points and provide the signal strengths to sensor module 205. Similarly, in some embodiments where sensor 105 is a Bluetooth sensor, sensor module 205 may instruct sensor 105 to scan through different radio frequencies to determine signal strengths (e.g., RSSI values) from detected Bluetooth transmitters (e.g., Bluetooth beacons) and provide the signal strengths to sensor module 205. In some embodiments where sensor 105 is a GPS sensor, sensor module 205 may instruct sensor 105 to provide sensor module 205 latitude and longitude coordinates based on GPS signals sensed by sensor 105. As another example, sensor module 205 may monitor sensor 105 and notify pipeline manager 120 regarding the state of sensor 105 (e.g., sensor 105 has been manually disabled or enabled).

In some embodiments, sensor module 205 may utilize a number of different scanning methods. For instance, if sensor 105 is a Wi-Fi or Bluetooth sensor, sensor module 205 may instruct sensor 105 to continuously scan for sensor data through different frequencies until sensor 105 receives duplicate results from a signal-transmitting device (e.g., a Wi-Fi access point, a Bluetooth transmitter, etc.). As another example, if sensor 105 is a Wi-Fi or Bluetooth sensor, sensor module 205 may instruct sensor 105 to scan for a defined period of time and then average the signal strength values detected from a signal-transmitting device (e.g., a Wi-Fi access point, a Bluetooth transmitter, etc.) during the defined period of time. In some embodiments, sensor module 205 instructs sensor 105 to scan for data for a defined minimum period of time. During a period of time of a scan, sensor 105 may detect one or more signals from one or more signal-transmitting devices. For example, during a scanning period of five seconds, a Bluetooth sensor may detect ten signals received from three different Bluetooth transmitters resulting in a total of thirty sets of sensor data (ten sets of sensor data from each of the three different Bluetooth transmitters).

Sensor module 205 may receive sensor data from sensor 105 (e.g., a Wi-Fi sensor) via an operating system running on a device on which system 100 is implemented. In some embodiments, sensor module 205 registers with the operating system to receive scan updates from sensor 105. When sensor module 205 triggers a scan (e.g., by sending a request to the operating system), the operating system processes the request in the background and passes the result of the scan to sensor module 205.

In some embodiments, sensor module 205 drops certain sensor data received from sensor 105. For example, sensor data from a Wi-Fi access point may include a media access control (MAC) address of the Wi-Fi access point, which is used to uniquely identify the Wi-Fi access point from other Wi-Fi access points. When a Wi-Fi access point does not include a MAC address in the sensor data or includes an invalid MAC address (e.g., 00-00-00-00-00-00), sensor module 205 drops such sensor data. As another example, sensor module 205 may drop sensor data that includes signal strength values that fall below a defined threshold value (e.g., −85 dBm, −90 dBm, etc.). Once sensor module 205 completes a scan operation, sensor 205 notifies pipeline manager 120 and sends the sensor data to pipeline manager 120, which pipeline manager forwards to pre-processor 210 for pre-processing.

Pre-processor 210 performs various pre-processing operations on sensor data received from pipeline manager 120. As illustrated in FIG. 2, pre-processor 210 includes filtering manager 220 and smoothing engine 230. When pre-processor 210 receives sensor data from pipeline manager 120, pre-processor 210 sends the sensor data to filtering manager 220 to perform filtering operations on the sensor data. Once the sensor data has been filtered, filtering manager 220 sends the sensor data to smoothing engine 230 to perform smoothing operations on the sensor data. Smoothing engine 230 then passes the smoothed data to pipeline manager 120, which pipeline manager 120 forwards to processor 215 for processing.

As shown, filtering manager 220 includes a series of filters 225*a-n* that are each configured to perform a particular filtering operation. The output of a filter 225 (e.g., filter 225*a*) is provided as the input to the next filter (e.g., filter 225*b*) in the series. In some embodiments, sensor data includes various types of data such as a signal strength value (e.g., an RSSI value), a unique identifier (e.g., a basic service set identification (BSSID), a MAC address of the device, device name, etc.) associated with a signal-transmitting device from which a signal is received, a unique identifier (e.g., a service set identifier (SSID)) associated with a network (e.g., a WLAN) to which the signal-transmitting device belongs, etc. A filter 225 may be configured to filter the sensor data based on the aforementioned types of data or fields. For example, a filter 225 may be configured to filter out sensor data that is at or below a threshold signal strength value, sensor data that is within or outside a range of signal strength values, sensor data determined from a signal received from a signal-transmitting device, sensor data determined from a signal received from a-transmitting device that belongs to a particular network. A filter 225 may be configured to apply a defined type of filter (e.g., a Gaussian filter, a Kalman filter, a particle filter, a better location filter, etc.) to the sensor data.

Smoothing engine 230 may be configured to apply a smoothing operation on the filtered sensor data. As mentioned above, a scan for sensor data may performed for a period of time during which one or more sets of sensor data from one or more signal-transmitting devices may be collected. In such instances, smoothing engine 230 may perform a smoothing operation on the sensor data collected from a particular signal-transmitting device. In this manner, smoothing engine 230 generates a single set of sensor data for each signal-transmitting device that represents the sensor data collected during the period of time.

In different embodiments, smoothing engine 230 employs different types of smoothing operations. For instance, in some embodiments, smoothing engine 230 may calculate an average of the signal strength values collected from a particular signal-transmitting device during the period of time. In other embodiments, smoothing engine 230 may calculate a median of the signal strength values collected from a particular signal-transmitting device during the period of time. Smoothing engine 230 may use values from previous scans to calculate a sliding average or sliding median.

Processor 215 is responsible for determining potential locations of a device on which system 100 is implemented. As shown in FIG. 2, processor 215 includes location engine 235 and geocoding manager 240. When processor 215 receives pre-processed sensor data from pipeline manager 120, processor 215 sends the sensor data to location engine manager 220 to determine potential locations of a device on which system 100 is implemented. After such determinations, location engine manager 235 passes the potential location data to geocoding manager 240 to perform geocoding operations on the potential location data. Geocoding manager 240 then sends the geocoded potential location data to pipeline manager 120, which pipeline manager 120 forwards to location selector 125.

Location engine 235 uses one of any number of location tracking techniques. For example, in some embodiments, a pattern-matching approach involves using a set of reference sensor signal values to derive the location of a device by comparing sensor signal values of collected sensor data to the set of reference sensor signal values. The set of reference sensor signal values are recorded during a calibration phase in which sensor signal values are recorded at defined reference locations and stored the reference sensor signal values along with a unique location identifier. In some embodiments, the reference signal sensor values are stored in reference data storage 280 (e.g., a database) that is included in system 100.

Figure 3:
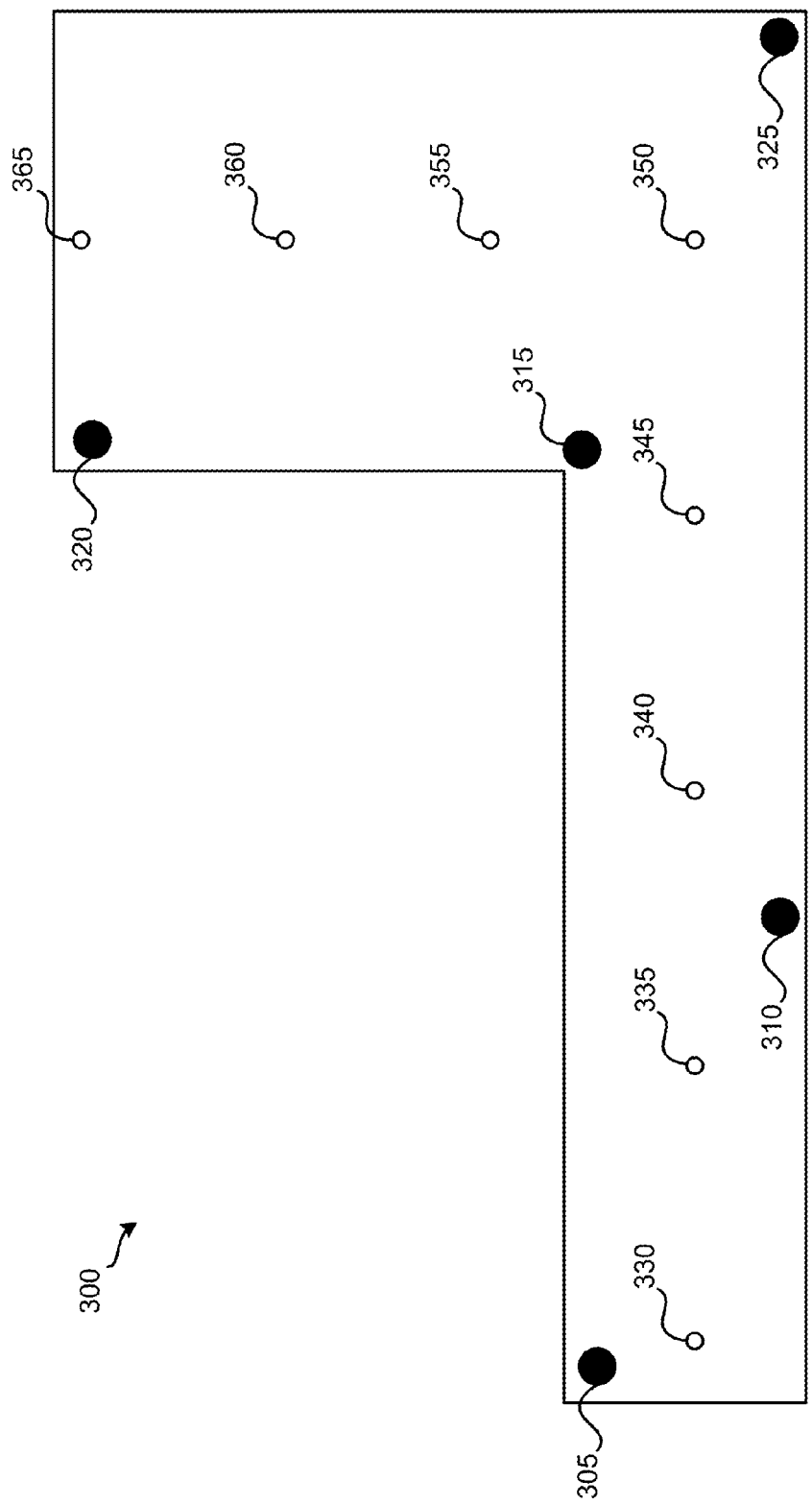
FIG. 3 illustrates an example structure that includes signal-transmitting devices and reference locations according to some embodiments.

FIG. 3 illustrates an example structure 300 that includes signal-transmitting devices and reference locations according to some embodiments. In particular, structure 300 includes signal-transmitting devices 305-325. In this example, signal-transmitting devices 305-325 may be Wi-Fi access points or Bluetooth beacons. FIG. 3 also illustrates a set of reference locations 330-365. As explained above, reference sensor signal values may be recorded at defined reference locations. FIG. 4 illustrates a table 400 of example reference sensor signal values recorded at the reference locations illustrated in FIG. 3 according to some embodiments. As shown, each row in table 400 includes signal strength values determined from signals received from signal-transmitting devices 305-325 at a particular reference location. In some embodiments, a set of reference sensor signal values are stored in an m-dimensional vector where each dimension includes the reference sensor signal values at each reference location for a particular signal-transmitting device. Referring to FIG. 4 as an example, the reference sensor signal values shown in table 400 may be stored in a five-dimensional vector. Each vector includes the reference sensor signal values of a sensor signal column in table 400.

Returning back to FIG. 2, when a pattern-matching approach is employed, location engine 235 may be configured to determine a set of potential locations using an adapted nearest neighbor (ANN) technique. Under the ANN technique, the difference between reference sensor signal values and sensor signal values of collected sensor data may be calculated for a particular reference location using the following equations:

$$\sum_{j=1}^{m} c_j^{(i)\frac{1}{3}}$$

$$c_j^{(i)} = |r_j^{(i)} - s_j| \text{ if } |r_j^{(i)} - s_j| \le 20$$

$$c_j^{(i)} = 20 \text{ if } |r_j^{(i)} - s_j| > 20$$

where $r_j^{(i)}$ represents to the reference signal sensor value (e.g., RSSI value) determined from signals received from the $j^{th}$ signal-transmitting device at the $i^{th}$ reference location and $s_j$ represents the signal sensor value determined from signals received from the $j^{th}$ signal-transmitting device during a collection of sensor data (e.g., a scan). Location engine 235 may access reference data storage 280 to retrieve the reference sensor signal values.

After calculating the difference (also referred to as a distance metric) for each the reference location, location engine 235 generates a list of potential locations that includes, for each potential location, a location identifier that represents a reference location and the corresponding distance metric calculated for the reference location. In some embodiments, location engine 235 orders the list of potential locations with the reference location having the lowest distance metric at the top of the list and the reference locations having the highest distance metric at the bottom of the list. In some embodiments, location engine 235 includes only a defined number (e.g., 3, 5, 10, etc.) of the reference locations with the lowest distance metrics in the list of potential locations.

Another example technique that may be used to determine potential locations of a device on which system 100 is implemented is referred to as an RSSI proximity technique. Under such a technique, location engine 235 may be configured to calculate a proximity metric using the following equation:

$$\delta_j = \frac{r_j - s_j}{\text{minRSSI}}$$

where $r_j$ represents the reference signal sensor value (e.g., RSSI value) for the $j^{th}$ signal-transmitting device. In some embodiments, a reference signal sensor value for a particular signal-transmitting device may be determined by recording and storing a sensor signal value determined from signals received from the particular signal-transmitting device at a defined distance (e.g., one meter, three meters, five meters, etc.) from the particular signal-transmitting device. In some embodiments, the reference signal sensor values are stored in reference data storage 280. $s_j$ represents the signal sensor value determined from signals received from the $j^{th}$ signal-transmitting device during a collection of sensor data (e.g., a scan). min RSSI represents a predefined minimum sensor signal value (e.g., −90 dBm, −100 dBm, −110 dBm, etc.). Location engine 235 may access reference data storage 280 to retrieve the reference sensor signal values.

After calculating the proximity metric for each the reference location, location engine 235 generates a list of potential locations that includes, for each potential location, a location identifier that represents a location of a signal-transmitting device and the corresponding proximity metric calculated for the location of the signal-transmitting device. In some embodiments, location engine 235 orders the list of potential locations with the location of the signal-transmitting device having the lowest proximity metric at the top of the list and the location of the signal-transmitting device having the highest proximity metric at the bottom of the list. In some embodiments, location engine 235 includes only a defined number (e.g., 3, 5, 10, etc.) of the reference locations with the lowest proximity metrics in the list of potential locations.

The above description illustrates one possible technique for determining potential locations when a pattern-matching approach is used. One of ordinary skill in the art will realize that location engine 235 may be configured to use other location tracking techniques under a pattern-matching approach. For instance, location engine 235 may use a nearest neighbor technique, a cosine similarity technique, a Dice similarity technique, an overlap similarity technique, a Jaccard similarity technique, etc., or any combination thereof. Regardless of the technique used, location engine 235 generates a list of potential locations that includes, for each potential location, a location identifier that represents a reference location and the corresponding metric calculated for the reference location according to the technique in some embodiments. Similarly, location engine 235 may order the list of potential locations with the reference location having the lowest metric at the top of the list and the reference location having the highest metric at the bottom of the list. Location engine 235 may also include only a defined number (e.g., 3, 5, 10, etc.) of the reference locations with the lowest metrics in the list of potential locations.

Geocoding manager 240 is configured to enrich the set of potential locations that geocoding manager 240 receives from location engine 235 with location information. To obtain location information for the set of potential locations, geocoding manager 240 may access geocoding data storage 290 (e.g., a database) to identify and retrieve location descriptions that correspond to the potential locations. Geocoding data storage 290, which may be included in system 100, may be configured to store a list of location identifiers and corresponding location descriptions. In some embodiments, a location description is a human-readable description of a known location (e.g., a reference location, a location of a signal-transmitting device, etc.). A location description may be determined according to a location model.

Figure 5:
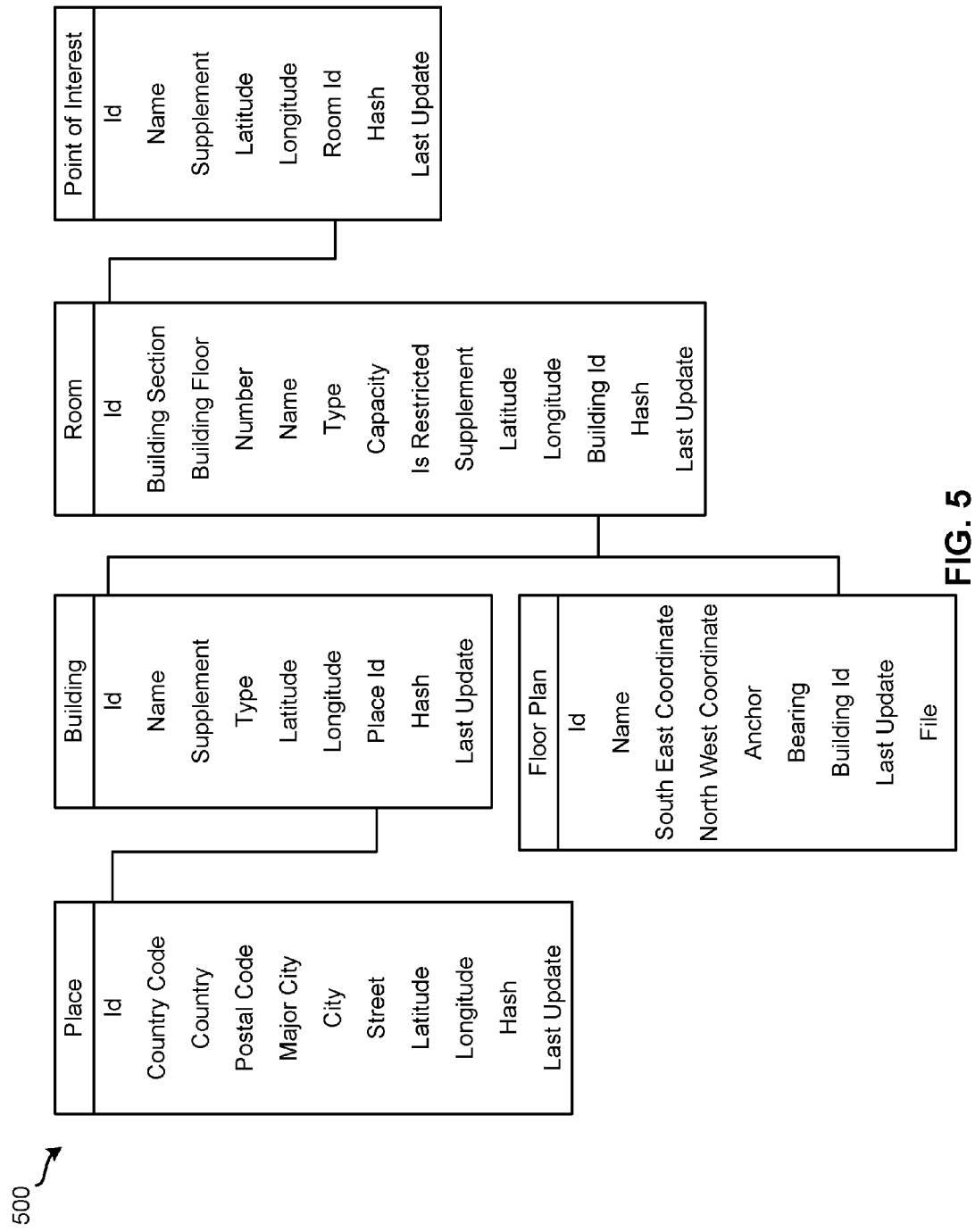
FIG. 5 illustrates an example location model according to some embodiments.

FIG. 5 illustrates an example location model 500 according to some embodiments. As shown, location model 500 defines location descriptions according to a four layer model that includes Places, Buildings, Rooms, and Points of Interest (POI). A Place in location model 500 may be described by an address (e.g., street, city, state, country, etc.) and/or latitude and longitude coordinates. A Building in location model 500 may be described by a name of a building, a supplemental name of the building (e.g., an internal name), a type (e.g. parking garage, office building, house, apartment complex, etc.), and/or latitude and longitude coordinates. The next layer in location model 500 is a room, which may be described by a building floor number, a building floor section, a name of the room, a supplemental name of the room (e.g., manager's office), a room type (e.g., conference room, office, kitchen, bathroom, etc.), and/or latitude and longitude coordinates. The fourth layer in location model 500 is a POI. A room may have be a number of POIs such as a coffee machine, a desk, a plant, etc. A POI may be described by a name of a POI, a supplemental name of the POI (e.g., a relative location, a more specific object, etc.), and/or latitude and longitude coordinates.

Returning to FIG. 2, geocoding manager 240 may be configured to obtain location information for the set of potential locations using a geocoding service. For instance, sensor data detected from a GPS sensor includes latitude and longitude coordinate. In some such instances, geocoding manager 240 may pass the latitude and longitude coordinates to an online OpenStreetMap (OSM) service (e.g., an OSM server) that determines a location based on the latitude and longitude coordinates.

As explained above, the set of potential locations may include, for each potential location, a location identifier that represents a location (e.g., a reference location, a location of a signal-transmitting device, etc.) and the corresponding location metric (e.g., distance metric, proximity metric, angle metric, etc.) calculated for the location. Once geocoding manager 240 obtains location information (e.g., location descriptions, latitude and longitude coordinates, etc.) for the set of potential locations, geocoding manager 240 includes the location information in the set of potential locations. In some embodiments geocoding manager 240 replaces the location identifiers that represent the locations with the corresponding location information. Geocoding manager 240 then sends the geocoded set of potential locations to pipeline manager 120.

In some embodiments, one or more components of a sensor pipeline may include a throttle queue in order to prevent calculation errors from occurring when new sensor data arrives while sensor data is still being processed by a sensor pipeline. Such calculation errors may occur when certain operations (e.g., database queries, web requests, complex mathematical calculations, etc.) are being performed. In some embodiments, pre-processor 210 and/or processor 215 includes a throttle queue (not shown). A throttle queue may be configured to collect and store sensor data from sensor 105. The sensor data stored in a throttle queue may be processed according to a first in, first out (FIFO) order.

In some embodiments, a throttle queue is configured to collect a defined number (e.g., three, five, six, ten, etc.) of sets of sensor data from sensor 105. If a throttle queue is full when the throttle queue receives a new set of sensor data from sensor 105, the throttle queue removes the oldest set of sensor data in the throttle queue. Each throttle queue may have a set of capacity levels (e.g., "empty", "low", "high" or "full") and may report the capacity level to pipeline manager 120 once a capacity level marker is reached. Pipeline manager 120 may uses the capacity level information to adjust the scan interval in the corresponding sensor in order to ensure an optimal processing workflow.

Figure 6:
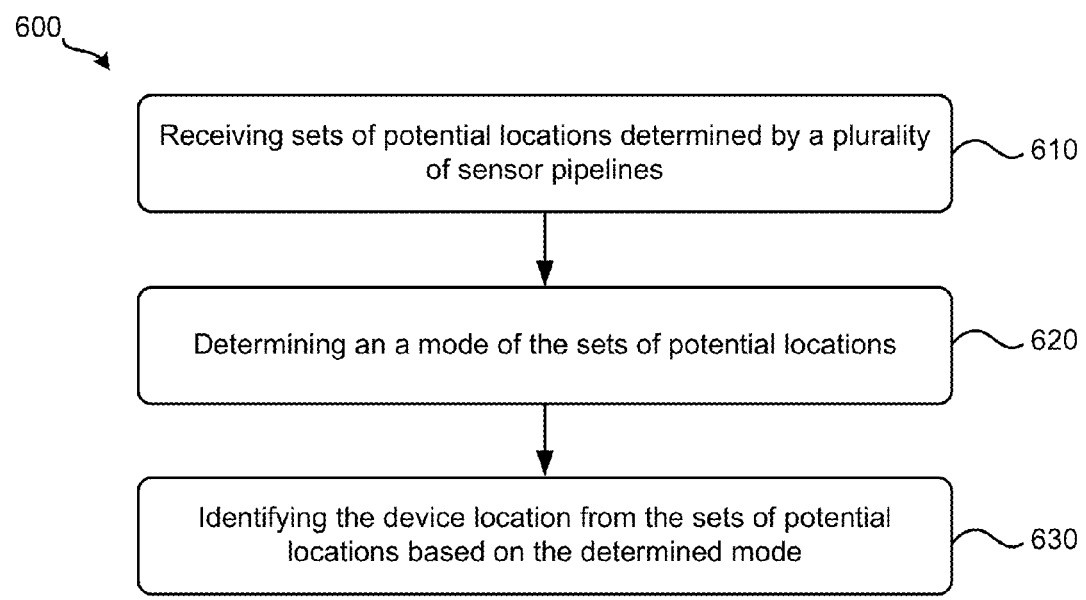
FIG. 6 illustrates a process for identifying a device location from sets of potential locations according to some embodiments.

As mentioned above, when pipeline manager 120 receives a set of potential locations from a sensor pipeline 115, pipeline manager 120 forwards the set of potential locations to location selector 125. In some embodiments, location selector 125 stores the most recent set of potential locations from each sensor pipeline 115. When location selector 125 receives a set of potential locations from pipeline manager 120, location selector 125 may perform an operation to identify a device location from the most recent sets of potential locations determined by sensor pipelines 115. In different embodiments, location selector 125 uses different techniques to identify the device location from the sets of potential locations. FIG. 6 illustrates one example of such techniques.

FIG. 6 illustrates a process 600 for identifying a device location from sets of potential locations according to some embodiments. In some embodiments, location selector 125 performs process 600 when the metrics calculated by sensor pipelines 115 are all based on the same set of reference data (e.g., reference locations and reference signal sensor values).

Process 600 starts by receiving, at 610, sets of potential locations determined a plurality of sensor pipelines. In some embodiments, each set of potential locations in the sets of potential locations is the most recent set of potential locations determined by a different sensor pipeline in the plurality of sensor pipelines. As described above, a set of potential locations may include, for each potential location, a location description of a location (e.g., a reference location, a location of a signal-transmitting device, etc.) and the corresponding location metric (e.g., distance metric, proximity metric, angle metric, etc.) calculated for the location. In addition, each set of potential locations may be a list of the potential locations ordered according to the metric from lowest to highest.

Next, process 600 determine, at 620, a mode of the sets of potential locations based on the location descriptions of the sets of potential locations. In some embodiments, process 600 determines the mode of the sets of potential locations by generating a master list of potential locations comprised of the sets of potential locations. Each set of potential locations in the master list may be ordered based on the sensor pipeline used to determine the set of potential locations and a ranked list of sensor pipelines. Specifically, the set of potential locations at the top of the master list is the set of potential locations determined by the highest ranking sensor pipeline in the ranked list of sensor pipelines. The next set of potential locations in the master list is the set of potential locations determined by the next highest ranking sensor pipeline in the ranked list of sensor pipelines and so on and so forth. Thus, the master list of potential locations is an ordered list of the sets of potential locations where the potential locations in each set of potential locations in the master list are ordered according to a metric from lowest to highest. After generating the master list, process 600 then identifies the location description that occurs the most number of times in the master list of potential locations.

Finally, process 600 identifies, at 630, the device location from the sets of potential locations based on the determined mode. If process 600 determines that the sets of potential locations has only one mode (i.e., one location description occurs the most number of times in the sets of potential locations), process identifies the mode as the device location. If process 600 determines that the sets of potential locations has multiple modes (i.e., several location descriptions occur the most number of times in the sets of potential locations), process 600 identifies the mode that is highest in the master list of potential locations as the device location. If process 600 determines that the sets of potential locations does not have mode (i.e., each unique location description occurs once in the sets of potential locations), process 600 identifies the location description at the top of the master list of potential locations as the device location.

Figure 7A:
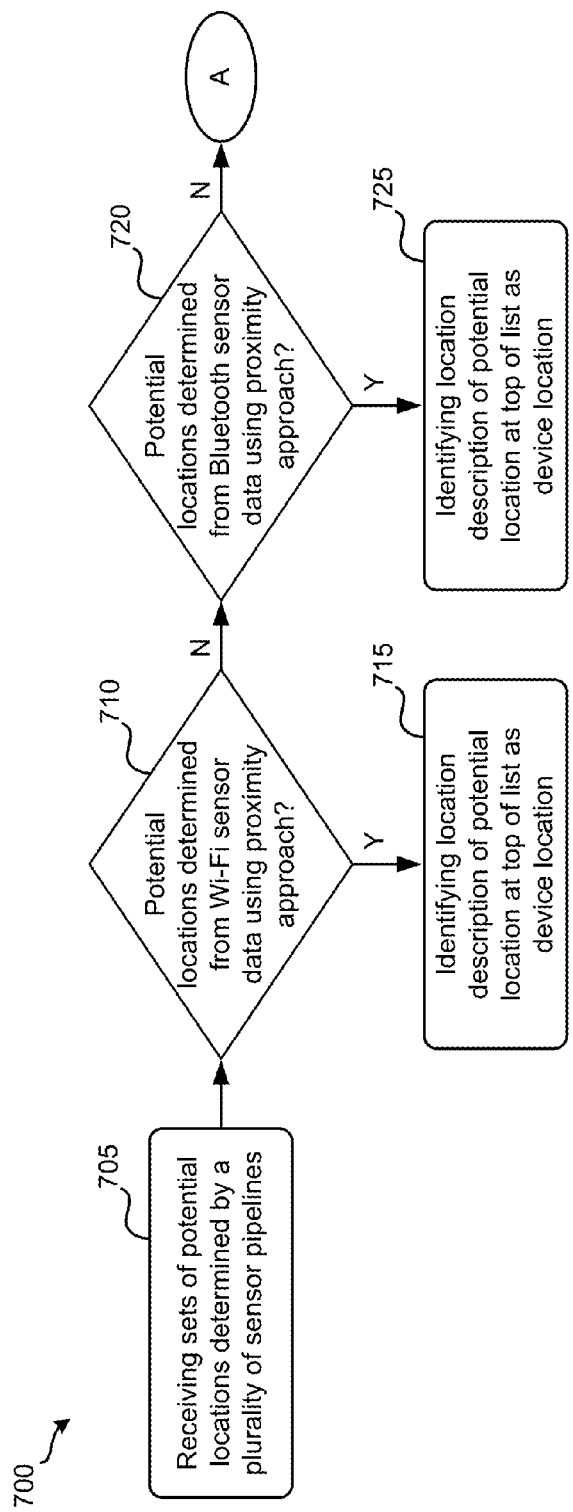
FIGS. 7A and 7B illustrate another process for identifying a device location from sets of potential locations according to some embodiments
Figure 7B:
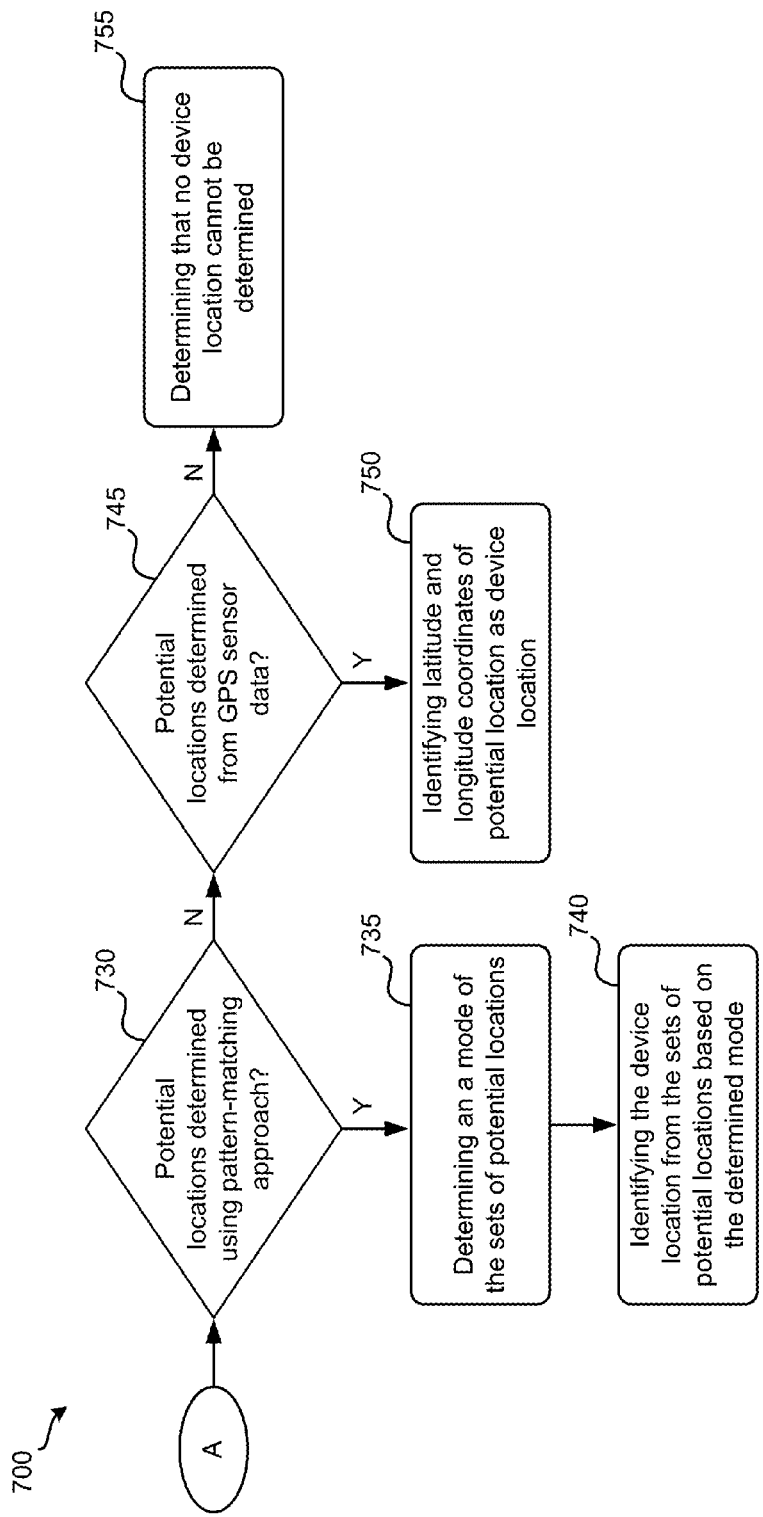

FIGS. 7A and 7B illustrate another process 700 for identifying a device location from sets of potential locations according to some embodiments. In some embodiments, location selector 125 performs process 700 when the metrics calculated by sensor pipelines 115 are based on different sets of reference data. For example, one set of sensor pipelines 115 using a pattern-matching approach may use one set of reference data while another set of sensor pipelines using a proximity approach may use another, different set of reference data.

Referring to FIG. 7A, process 700 begins in the same or a similar manner as process 600. Specifically, process 700 receives, at 705, sets of potential locations determined a plurality of sensor pipelines. In some embodiments, each set of potential locations in the sets of potential locations is the most recent set of potential locations determined by a different sensor pipeline in the plurality of sensor pipelines. As described above, a set of potential locations may include, for each potential location, a location description of a location (e.g., a reference location, a location of a signal-transmitting device, etc.) and the corresponding location metric (e.g., distance metric, proximity metric, angle metric, etc.) calculated for the location. In addition, each set of potential locations may be a list of the potential locations ordered according to the metric from lowest to highest.

Next, process 700 determines, at 710, whether the sets of potential locations includes a set of potential locations determined from Wi-Fi sensor data using a proximity approach (e.g., the RSSI proximity technique described above). If so, process 700 identifies, at 715, the location description of the potential location at the top of the list of the set of potential locations as the device location and then process 700 ends. If not, process 700 proceeds to operation 720. Process 700 may skip operation 715 and proceed to operation 720 if the proximity metric of the potential location at the top of the list of the set of potential locations is less than zero. In some embodiments, process 700 skips operation 715 and proceeds to operation 720 if the set of potential locations determined from Wi-Fi sensor data using the proximity approach is outdated. In some embodiments, a set of potential locations is outdated when a time difference between the time at which the set of potential locations is determined by a sensor pipeline and the time at which process 700 is being performed is greater than a defined amount of time (e.g., five seconds, ten seconds, 15 seconds etc.). In other embodiments, a set of potential locations is outdated when a defined number of sensor scans (e.g., three scans, five scans, eight scans, etc.) have been performed by one or more sensors. Still, in some embodiments, a set of potential locations is outdated when a state of the device on which process 700 is being performed changes. Details of device states are described below.

At 720, process 700 determines whether the sets of potential locations includes a set of potential locations determined from Bluetooth sensor data using a proximity approach (e.g., the RSSI proximity technique described above). If so, process 700 identifies, at 725, the location description of the potential location at the top of the list of the set of potential locations as the device location and then process 700 ends. If not, process 700 proceeds to operation 730. Process 700 may skip operation 725 and proceed to operation 730 if the proximity metric of the potential location at the top of the list of the set of potential locations is less than zero. In some embodiments, process 700 skips operation 725 and proceeds to operation 730 if the set of potential locations determined from Bluetooth sensor data using a proximity approach is outdated.

Referring to FIG. 7B, process 700 then determines, at 730, whether the sets of potential locations includes one or more sets of potential locations determined using a pattern-matching approach (e.g., determined from Wi-Fi sensor data using the ANN technique described above, determined from Bluetooth sensor data using the ANN technique described above, etc.). If so, process 700 determines, at 735, a mode of the one or more sets of potential locations and identifies, at 740, the location description of the potential location at the top of the list of the set of potential locations as the device location and then process 700 ends. Process 700 may skip operations 735-740 and proceed to operation 745 if the one or more sets of potential locations determined using the pattern-matching approach are outdated.

Process 700 may perform operations 735 and 740 in the same or a similar manner as operations 620 and 630, respectively, described above by reference to FIG. 6. In some embodiments, the ranked list of sensor pipelines that process 700 uses in operation 740 to generate a master list of potential locations specifies that a sensor pipeline configured to process Wi-Fi sensor data is ranked higher than a sensor pipeline configured to process Bluetooth sensor data. If the one or more sets of potential locations includes at least one set of potential locations determined from Wi-Fi sensor data and at least one set of potential locations determined from Bluetooth sensor data, process 700 includes a maximum of the top two potential locations determined from Wi-Fi sensor data and a maximum of the top two potential locations determined from Wi-Fi sensor data. If the one or more sets of potential locations includes at least one set of potential locations determined from Wi-Fi sensor data and none determined from Bluetooth sensor data, process 700 includes a maximum of the top three potential locations determined from Wi-Fi sensor data. If the one or more sets of potential locations includes at least one set of potential locations determined from Bluetooth data and none determined from Wi-Fi sensor data, process 700 includes a maximum of the top five potential locations determined from Bluetooth sensor data. If process 700 determines that the sets of potential locations do not include a set of potential locations determined using a pattern-matching approach, process 700 proceeds to operation 745. In some embodiments, other maximums may be used for each of the cases.

At operation 745, process 700 determines whether the sets of potential locations includes a potential location determined from GPS sensor data. If so, process 700 identifies, at 750, the latitude and longitude coordinates of the potential location as the device location and then process 700 ends. If not, process 700 determines, at 755, that a device location cannot be determined. In some embodiments, process 700 sends a notification indicating that a device location cannot be determined to a UI component of system 100 for the UI component to display the notification on a display of a device on which system 100 is implemented.

Figure 8:
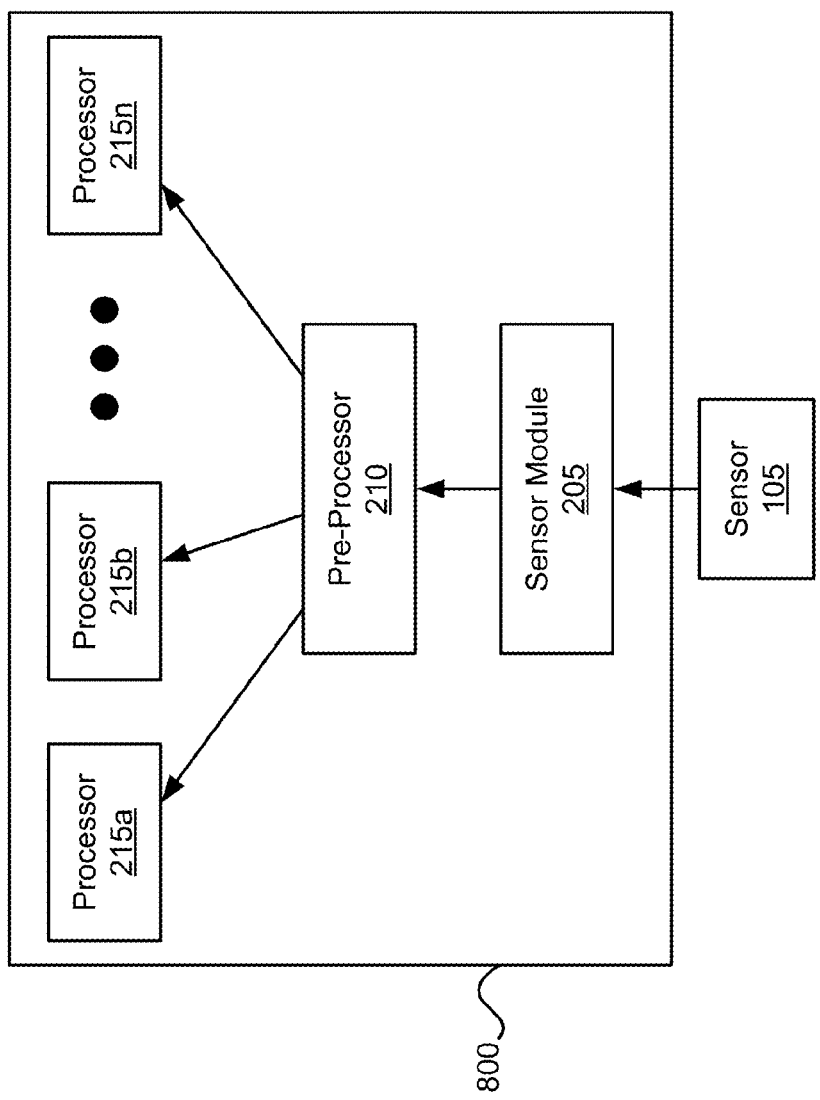
FIG. 8 illustrates an example configuration of a sensor pipeline according to some embodiments.

FIG. 2 illustrates one example of a configuration of a sensor pipeline. Specifically, sensor pipeline 200 receives input from one sensor 105 and generates one set of potential locations. In some embodiments, sensor pipeline 200 may be used to implement a sensor pipeline for processing GPS sensor data or a cellular sensor. A sensor pipeline may be configured differently in different embodiments. FIG. 8 illustrates an example configuration of a sensor pipeline 800 according to some embodiments. As shown, sensor pipeline 800 includes sensor module 205, pre-processor 210, and processors 215a-n. Sensor pipeline 800 receives input from one sensor 105 and processors 215a-n generates n different sets of potential locations. In some embodiments, sensor pipeline 800 may be used to implement a sensor pipeline that uses different techniques to process sensor data from the same sensor 105. For instance, sensor pipeline 800 may be used to implement a sensor pipeline that uses a pattern-matching technique (e.g., the ANN technique described above) and a proximity technique (e.g., the RSSI technique described above) to determine different sets of potential locations.

Figure 9:
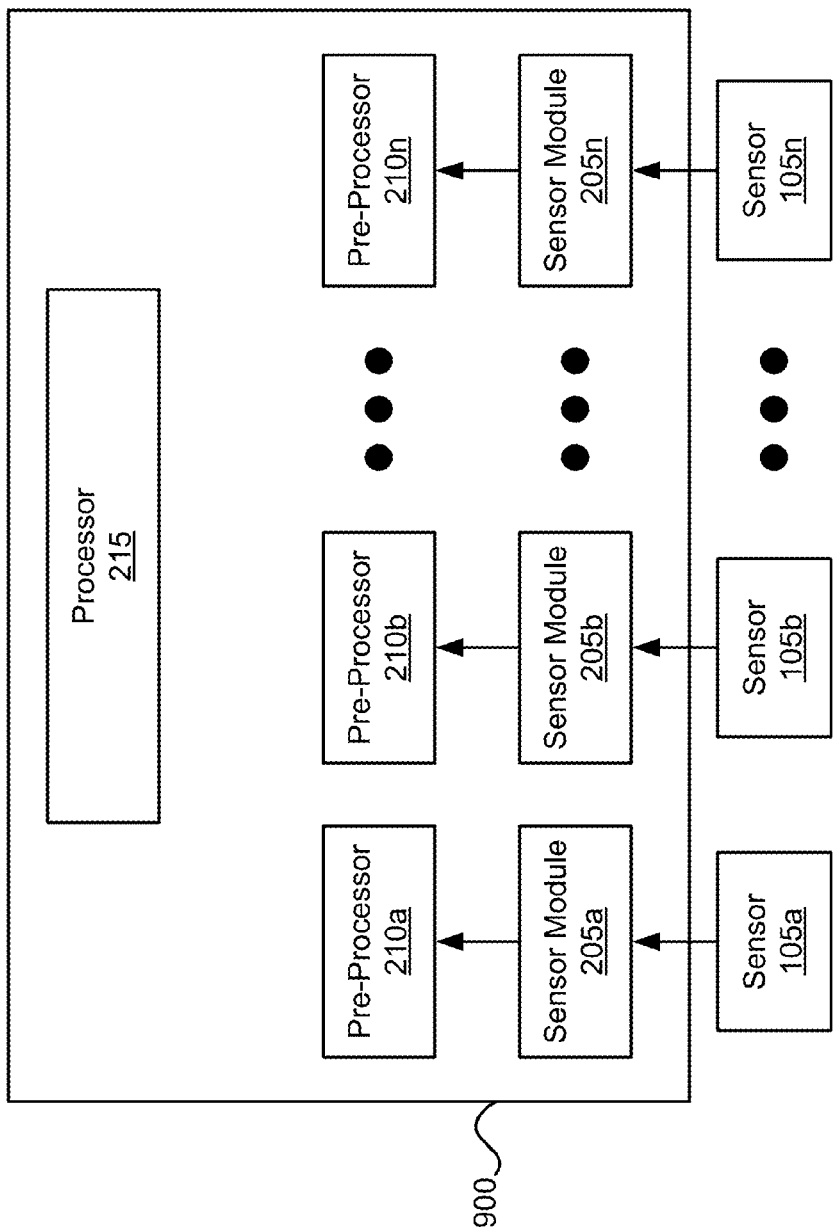
FIG. 9 illustrates another example configuration of a sensor pipeline according to some embodiments.

FIG. 9 illustrates another example configuration of a sensor pipeline according to some embodiments. As shown, sensor pipeline 900 includes sensor modules 205a-n, pre-processors 210a-n, and processor 215. Sensor pipeline 900 receives input from n number sensors 105 and processor 215 generates one set of potential locations. In some embodiments, sensor pipeline 900 may be used to implement a sensor pipeline that uses one technique to process sensor data from the multiple different sensors 105. Sensor pipeline 900 may be used to implement a sensor pipeline when a single sensor infrastructure is not sufficient. For example, a structure may have Wi-Fi access points with signal ranges that do not provide enough coverage throughout the structure or the Wi-Fi access points are poorly distributed (e.g. the Wi-Fi access points are distributed in one line). The structure also includes Bluetooth beacons throughout the structure that may provide coverage in the lacking areas of the Wi-Fi coverage. In such an example, sensor pipeline 900 may be used to implement a sensor pipeline that uses a pattern-matching technique (e.g., the ANN technique described above) to process sensor data from the Wi-Fi sensor data and Bluetooth sensor data.

In some embodiments, pipeline architecture 110 may include an energy manager (not shown) that is configured to detect movement of a device on which system 100 is implemented and adjust the scan interval of sensors 105a-n. For instance, if energy manager detects that the device is not moving (i.e., the location is not changing), energy manager reports such detection to pipeline manager 120, which requests sensor pipelines 115a-n to instructs sensors 105a-n to not scan for new data.

In some embodiments, system 100 includes a set of inertial sensors (not shown) that are communicatively coupled to energy manager. Examples of inertial sensors include an accelerometer, a step detection sensor, etc. Energy manager may receive motion information from the set of inertial sensors and location selector 125.

In some embodiments, the device is defined to be in one of six states. Energy manager may track determine and track the state of the device. Each state may have a predefined configuration that specifies which of sensors 105a-n are enabled and how often the specified sensors 105a-n scan for new data. In some embodiments, the states are defined by an area type ("Indoors", "Outdoors" and "Transition Zone" in this example) and the motion activity of the device (moving and not moving in this example). The area type "Indoors" represents an area inside a structure (e.g., a building) where infrastructures or reference points (e.g., Wi-Fi access points, Bluetooth beacons, etc.) can be detected. "Outdoors" represents any location other than an "Indoor" location. "Transition Zone" represents the transition between "Indoor" locations and "Outdoor" locations. In some embodiments, the configuration of states in which the device is "Indoors" specifies that Wi-Fi sensors and Bluetooth sensors are enabled while GPS sensors are disabled; the configuration of states in which the device is "Outdoors" specifies that GPS sensors are enabled while Wi-Fi sensors and Bluetooth sensors are disabled or configured to scan at a low frequency; and the configuration of states in which the device is "Transition Zone" specifies that all sensors are enabled.

Energy manager may start with the state of "Indoors" and "Not Moving" and configures the enabled sensors to scan at a default interval. When energy manager detects movement, energy manager changes the state to "Indoors—Moving"

and increases the scan interval of enabled sensors. Energy manager maintains the "Indoor" and "Moving" state until no movement has been detected for a defined period of time (e.g., 15 seconds, 30 seconds, 60 seconds, etc.) If location selector 125 cannot determine a device location within one scan interval while the device is in the "Indoor" and "Moving" state, energy manager changes the state to "Transition Zone". While in the "Transition Zone" state, sensor pipelines 115*a*-*n* attempt to determine potential locations. Energy manager maintains the "Transition Zone" until location selector 125 determines two consecutive device locations that indicate the same area type (e.g., "Indoors" or "Outdoors"). For example, if location selector 125 determines consecutive locations from GPS sensor data, energy manager changes the state to "Outdoors". As another example, if location selector 125 determines consecutive locations from Wi-Fi and/or Bluetooth sensor data, energy manager changes the state to "Indoors".

While in an "Outdoors" state (e.g., "Outdoors" and "Moving" or "Outdoors" and "Not Moving") and location selector 125 determines a reference location as the device location, energy manager changes the state the "Transition Zone". If only sensors for the "Indoors" (e.g., Wi-Fi sensors and/or Bluetooth sensors) state are available, energy manager maintains the "Indoors" state even if location selector 125 cannot determine a device location. Similarly, if only sensors for the "Outdoors" (e.g., GPS sensors) state are available, energy manager maintains the "Outdoors" state even if location selector 125 cannot determine a device location.

In some embodiments, pipeline architecture 110 includes a crowd-sourcing feature for collecting reference data (e.g., reference sensor signals, reference locations, etc.). In particular, the crowd-sourcing feature of pipeline architecture 110 allows new reference locations to be added and new reference sensor signal data to be recorded. In some embodiments, a user of a device on which system 100 is implemented may first specify the current location by selecting the building, the room and possibly the point of interest. If a room and/or a point of interest is not currently a reference location stored in a reference data storage (e.g., reference data storage 280), the current location is added to the asked to add it to the reference data storage. After the device location has been defined, pipeline architecture 110 detects and records sensor signal data in the reference data storage. Once the process is completed the new data is saved in the respective database. If floorplans are available for previously recorded reference data, pipeline architecture prompts the user to place the device position on a map that includes the floorplan to improve latitude and longitude coordinates. Similar to sensor pipelines used for determining potential locations of the device, sensor pipelines for recording new reference data may be configured.

For the placement of new infrastructure, pipeline architecture 110 collects sensor data for a defined amount of time (e.g., 10 seconds, 15 seconds, 30 seconds, etc.) and calculates the average signal strength value (e.g., RSSI value) to use as the reference sensor signal RSSI for the "RSSI proximity" strategy described above. The user may receive a list of averaged access points or beacons and selects the appropriate infrastructure to be placed at the defined location. For the recording of new sensor signal data, pipeline architecture 110 instructs the user to orient the device in four orientations (e.g., north, east, south, and west). At each orientation, pipeline architecture 110 performs a scan and calculates a reference sensor signal from sensor data received during the scan. In some embodiments, pipeline architecture 110 records additional data like the orientation of the device and the device identifier. In some embodiments, the reference data is stored in a master data storage (e.g., a data storage included in a server, a data storage included on a device on which system 100 is implemented, etc.) that is configured to collect new reference data from devices and maintain the reference data. Devices on which system 100 is implemented may send new reference data to the master data storage and synchronize with the master data storage.

Figure 10:
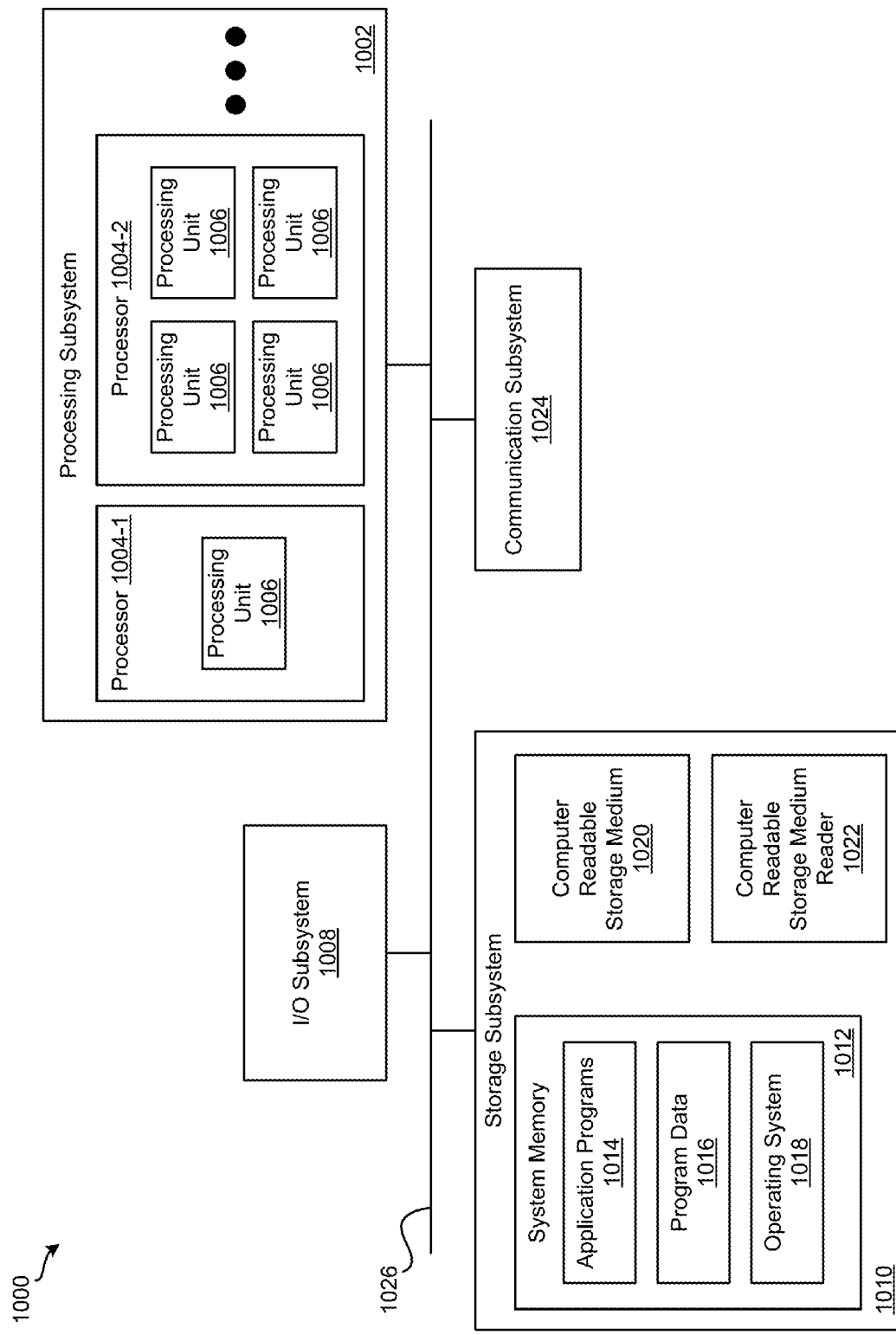
FIG. 10 illustrates an exemplary computer system, in which various embodiments may be implemented.

FIG. 10 illustrates an exemplary computer system 1000, in which various embodiments may be implemented. Computer system 1000 may be a desktop computer, a laptop, a server computer, or any other type of computer system or combination thereof. Some or all elements of system 110 or combinations thereof can be included or implemented in computer system 1000. In addition, computer system 1000 can implement many of the operations, methods, and/or processes described above (e.g., process 600 and 700). As shown in FIG. 10, computer system 1000 includes processing subsystem 1002, which communicates, via bus subsystem 1002, with input/output (I/O) subsystem 1008, storage subsystem 1010 and communication subsystem 1024.

Bus subsystem 1002 is configured to facilitate communication among the various components and subsystems of computer system 1000. While bus subsystem 1002 is illustrated in FIG. 10 as a single bus, one of ordinary skill in the art will understand that bus subsystem 1002 may be implemented as multiple buses. Bus subsystem 1002 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1002, which can be implemented as one or more integrated circuits (e.g., a conventional microprocessor or microcontroller), controls the operation of computer system 1000. Processing subsystem 1002 may include one or more processors 1004. Each processor 1004 may include one processing unit 1006 (e.g., a single core processor such as processor 1004-1) or several processing units 1006 (e.g., a multicore processor such as processor 1004-2). In some embodiments, processors 1004 of processing subsystem 1002 may be implemented as independent processors while, in other embodiments, processors 1004 of processing subsystem 1002 may be implemented as multiple processors integrate into a single chip or multiple chips. Still, in some embodiments, processors 1004 of processing subsystem 1002 may be implemented as a combination of independent processors and multiple processors integrated into a single chip or multiple chips.

In some embodiments, processing subsystem 1002 can execute a variety of programs or processes in response to program code and can maintain multiple concurrently executing programs or processes. At any given time, some or all of the program code to be executed can reside in processing subsystem 1002 and/or in storage subsystem 1010. Through suitable programming, processing subsystem 1002 can provide various functionalities, such as the functionalities described above by reference to process 600 and process 700, etc.

I/O subsystem 1008 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1000 to a user or another device (e.g., a printer).

As illustrated in FIG. 10, storage subsystem 1010 includes system memory 1012, computer-readable storage medium 1020, and computer-readable storage medium reader 1022. System memory 1012 may be configured to store software in the form of program instructions that are loadable and executable by processing subsystem 1002 as well as data generated during the execution of program instructions. In some embodiments, system memory 1012 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1012 may include different types of memory, such as static random access memory (SRAM) and/or dynamic random access memory (DRAM). System memory 1012 may include a basic input/output system (BIOS), in some embodiments, that is configured to store basic routines to facilitate transferring information between elements within computer system 1000 (e.g., during start-up). Such a BIOS may be stored in ROM (e.g., a ROM chip), flash memory, or any other type of memory that may be configured to store the BIOS.

As shown in FIG. 10, system memory 1012 includes application programs 1014, program data 1016, and operating system (OS) 1018. OS 1018 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1020 may be a non-transitory computer-readable medium configured to store software (e.g., programs, code modules, data constructs, instructions, etc.). Many of the components (e.g., pipeline architecture 110, sensor pipeline 200, sensor pipeline 800, sensor pipeline 900, etc.) and/or processes (e.g., process 600 and 700) described above may be implemented as software that when executed by a processor or processing unit (e.g., a processor or processing unit of processing subsystem 1002) performs the operations of such components and/or processes. Storage subsystem 1010 may also store data used for, or generated during, the execution of the software.

Storage subsystem 1010 may also include computer-readable storage medium reader 1022 that is configured to communicate with computer-readable storage medium 1020. Together and, optionally, in combination with system memory 1012, computer-readable storage medium 1020 may comprehensively represent remote, local, fixed, and/or removable storage devices plus storage media for temporarily and/or more permanently containing, storing, transmitting, and retrieving computer-readable information.

Computer-readable storage medium 1020 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1024 serves as an interface for receiving data from, and transmitting data to, other devices, computer systems, and networks. For example, communication subsystem 1024 may allow computer system 1000 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1024 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1024 may provide components configured for wired communication (e.g., Ethernet) in addition to or instead of components configured for wireless communication.

One of ordinary skill in the art will realize that the architecture shown in FIG. 10 is only an example architecture of computer system 1000, and that computer system 1000 may have additional or fewer components than shown, or a different configuration of components. The various components shown in FIG. 10 may be implemented in hardware, software, firmware or any combination thereof, including one or more signal processing and/or application specific integrated circuits.

Figure 11:
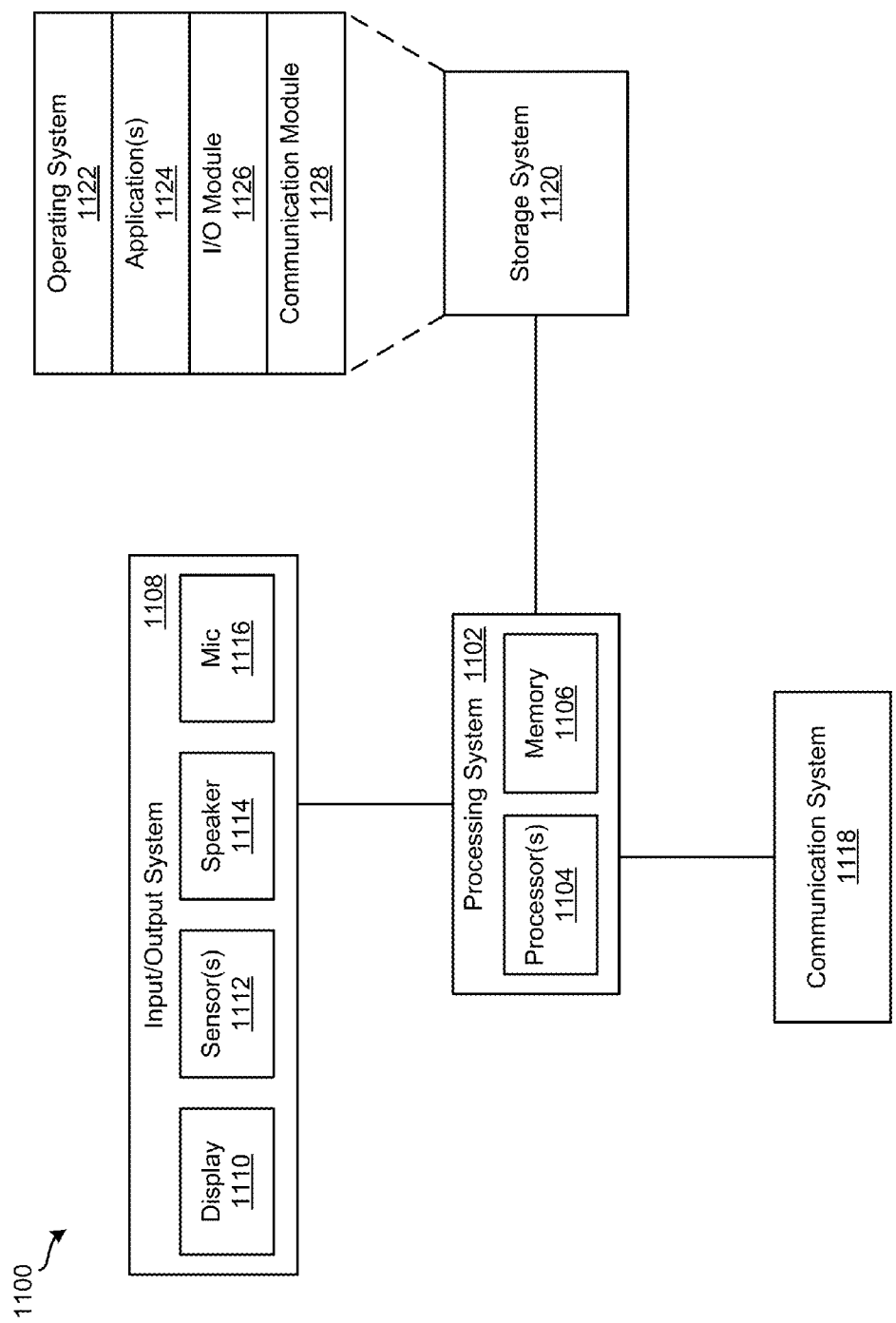
FIG. 11 illustrates an exemplary computing device, in which various embodiments may be implemented.

FIG. 11 illustrates an exemplary computing device 1100, in which various embodiments may be implemented. Computing device 1100 may be a cellphone, a smartphone, a wearable device, an activity tracker or manager, a tablet, a personal digital assistant (PDA), a media player, or any other type of mobile computing device or combination thereof. Some or all elements of system 110 or combinations thereof can be included or implemented in computing device 1100. In addition, computing device 1100 can implement many of the operations, methods, and/or processes described above (e.g., process 600 and 700). As shown in FIG. 11, computing device 1100 includes processing system 1102, input/output (I/O) system 1108, communication system 1118, and storage system 1120. These components may be coupled by one or more communication buses or signal lines.

Processing system 1102, which can be implemented as one or more integrated circuits (e.g., a conventional microprocessor or microcontroller), controls the operation of computing device 1100. As shown, processing system 1102 includes one or more processors 1104 and memory 1106. Processors 1104 are configured to run or execute various software and/or sets of instructions stored in memory 1106 to perform various functions for computing device 1100 and to process data.

Each processor of processors 1104 may include one processing unit (e.g., a single core processor) or several processing units (e.g., a multicore processor). In some embodiments, processors 1104 of processing system 1102 may be implemented as independent processors while, in other embodiments, processors 1104 of processing system 1102 may be implemented as multiple processors integrate into a single chip. Still, in some embodiments, processors 1104 of processing system 1102 may be implemented as a combination of independent processors and multiple processors integrated into a single chip.

Memory 1106 may be configured to receive and store software (e.g., operating system 1122, applications 1124, I/O module 1126, communication module 1128, etc. from storage system 1120) in the form of program instructions that are loadable and executable by processors 1104 as well as data generated during the execution of program instructions. In some embodiments, memory 1106 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1108 is responsible for receiving input through various components and providing output through various components. As shown for this example, I/O system 1108 includes display 1110, one or more sensors 1112, speaker 1114, and microphone 1116. Display 1110 is configured to output visual information (e.g., a graphical user interface (GUI) generated and/or rendered by processors 1104). In some embodiments, display 1110 is a touch screen that is configured to also receive touch-based input. Display 1110 may be implemented using liquid crystal display (LCD) technology, light-emitting diode (LED) technology, organic LED (OLED) technology, organic electro luminescence (OEL) technology, or any other type of display technologies. Sensors 1112 may include any number of different types of sensors for measuring a physical quantity (e.g., temperature, force, pressure, acceleration, orientation, light, radiation, etc.). Speaker 1114 is configured to output audio information and microphone 1116 is configured to receive audio input. One of ordinary skill in the art will appreciate that I/O system 1108 may include any number of additional, fewer, and/or different components. For instance, I/O system 1108 may include a keypad or keyboard for receiving input, a port for transmitting data, receiving data and/or power, and/or communicating with another device or component, an image capture component for capturing photos and/or videos, etc.

Communication system 1118 serves as an interface for receiving data from, and transmitting data to, other devices, computer systems, and networks. For example, communication system 1118 may allow computing device 1100 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1118 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1118 may provide components configured for wired communication (e.g., Ethernet) in addition to or instead of components configured for wireless communication.

Storage system 1120 handles the storage and management of data for computing device 1100. Storage system 1120 may be implemented by one or more non-transitory machine-readable mediums that are configured to store software (e.g., programs, code modules, data constructs, instructions, etc.) and store data used for, or generated during, the execution of the software. Many of the components (e.g., pipeline architecture 110, sensor pipeline 200, sensor pipeline 800, sensor pipeline 900, etc.) and/or processes (e.g., process 600 and 700) described above may be implemented as software that when executed by a processor or processing unit (e.g., processors 1104 of processing system 1102) performs the operations of such components and/or processes.

In this example, storage system 1120 includes operating system 1122, one or more applications 1124, I/O module 1126, and communication module 1128. Operating system 1122 includes various procedures, sets of instructions, software components and/or drivers for controlling and managing general system tasks (e.g., memory management, storage device control, power management, etc.) and facilitates communication between various hardware and software components. Operating system 1122 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1124 can include any number of different applications installed on computing device 1100. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1126 manages information received via input components (e.g., display 1110, sensors 1112, and microphone 1116) and information to be outputted via output components (e.g., display 1110 and speaker 1114). Communication module 1128 facilitates communication with other devices via communication system 1118 and includes various software components for handling data received from communication system 1118.

One of ordinary skill in the art will realize that the architecture shown in FIG. 11 is only an example architecture of computing device 1100, and that computing device 1100 may have additional or fewer components than shown, or a different configuration of components. The various components shown in FIG. 11 may be implemented in hardware, software, firmware or any combination thereof, including one or more signal processing and/or application specific integrated circuits.

Figure 12:
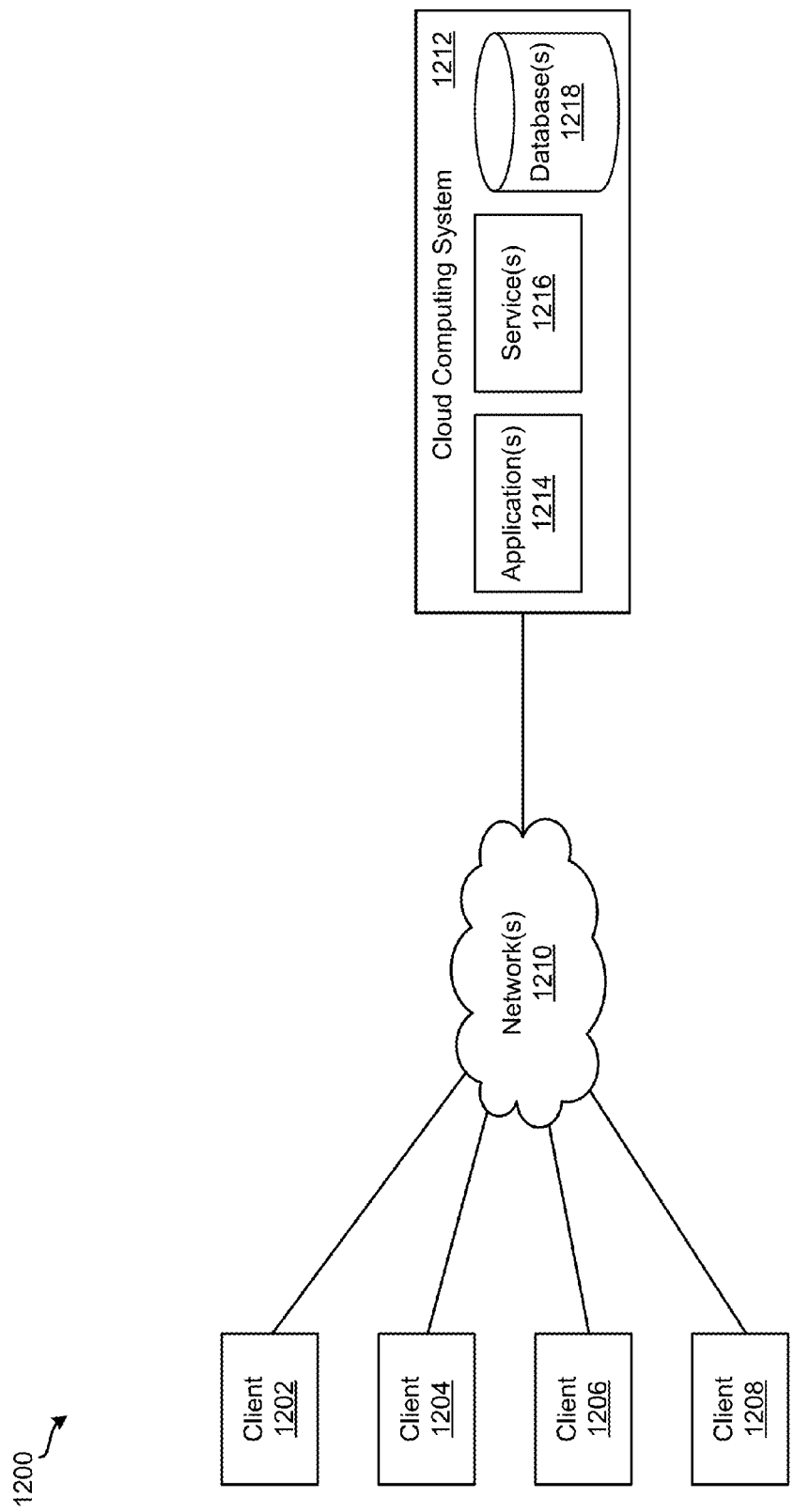
FIG. 12 illustrates system for implementing various embodiments described above.

FIG. 12 illustrates system 1200 for implementing various embodiments described above. As shown, system 1200 includes client devices 1202-1208, one or more networks 1210, and cloud computing system 1212. Cloud computing system 1212 is configured to provide resources and data to client devices 1202-1208 via networks 1210. In some embodiments, cloud computing system 1200 provides resources to any number of different users (e.g., customers, tenants, organizations, etc.). Cloud computing system 1212 may be implemented by one or more computer systems (e.g., servers), virtual machines operating on a computer system, or a combination thereof.

As shown, cloud computing system 1212 includes one or more applications 1214, one or more services 1216, and one or more databases 1218. Cloud computing system 1200 may provide applications 1214, services 1216, and databases 1218 to any number of different customers in a self-service, subscription-based, elastically scalable, reliable, highly available, and secure manner.

In some embodiments, cloud computing system 1200 may be adapted to automatically provision, manage, and track a customer's subscriptions to services offered by cloud computing system 1200. Cloud computing system 1200 may provide cloud services via different deployment models. For example, cloud services may be provided under a public cloud model in which cloud computing system 1200 is owned by an organization selling cloud services and the cloud services are made available to the general public or different industry enterprises. As another example, cloud services may be provided under a private cloud model in which cloud computing system 1200 is operated solely for a single organization and may provide cloud services for one or more entities within the organization. The cloud services may also be provided under a community cloud model in which cloud computing system 1200 and the cloud services provided by cloud computing system 1200 are shared by several organizations in a related community. The cloud services may also be provided under a hybrid cloud model, which is a combination of two or more of the aforementioned different models.

In some instances, any one of applications 1214, services 1216, and databases 1218 made available to client devices 1202-1208 via networks 1210 from cloud computing system 1200 is referred to as a "cloud service." Typically, servers and systems that make up cloud computing system 1200 are different from the on-premises servers and systems of a customer. For example, cloud computing system 1200 may host an application and a user of one of client devices 1202-1208 may order and use the application via networks 1210.

Applications 1214 may include software applications that are configured to execute on cloud computing system 1212 (e.g., a computer system or a virtual machine operating on a computer system) and be accessed, controlled, managed, etc. via client devices 1202-1208. In some embodiments, applications 1214 may include server applications and/or mid-tier applications (e.g., HTTP (hypertext transport protocol) server applications, FTP (file transfer protocol) server applications, CGI (common gateway interface) server applications, JAVA server applications, etc.) Services 1216 are software components, modules, application, etc. that are configured to execute on cloud computing system 1212 and provide functionalities to client devices 1202-1208 via networks 1210. Services 1216 may be web-based services or on-demand cloud services. In some embodiments, services 1216 of system 1200 may be used to implement the processor component (e.g., processor 215) of sensor pipelines 115a-n. In other embodiments, services 1216 of system 1200 may be used to implement the pre-processor (e.g., pre-processor 210) and processor components (e.g., processor 215) of sensor pipelines 115a-n.

Databases 1218 are configured to store and/or manage data that is accessed by applications 1214, services 1216, and/or client devices 1202-1208. In some embodiments, databases 1218 may be used to implement data storages 280 and 290. Databases 1218 may reside on a non-transitory storage medium local to (and/or resident in) cloud computing system 1212, in a storage-area network (SAN), on a non-transitory storage medium local located remotely from cloud computing system 1212. In some embodiments, databases 1218 may include relational databases that are managed by a relational database management system (RDBMS). Databases 1218 may be a column-oriented databases, row-oriented databases, or a combination thereof. In some embodiments, some or all of databases 1218 are in-memory databases. That is, in some such embodiments, data for databases 1218 are stored and managed in memory (e.g., random access memory (RAM)).

Client devices 1202-1208 are configured to execute and operate a client application (e.g., a web browser, a proprietary client application, etc.) that communicates with applications 1214, services 1216, and/or databases 1218 via networks 1210. This way, client devices 1202-1208 may access the various functionalities provided by applications 1214, services 1216, and databases 1218 while applications 1214, services 1216, and databases 1218 are operating (e.g., hosted) on cloud computing system 1200. Client devices 1202-1208 may be include pipeline architecture 110. Although system 1200 is shown with four client devices, any number of client devices may be supported.

Networks 1210 may be any type of network configured to facilitate data communications among client devices 1202-1208 and cloud computing system 1212 using any of a variety of network protocols. Networks 1210 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

What is claimed is:

1. A non-transitory machine-readable medium storing a program executable by at least one processing unit of a device comprising a first sensor and a second sensor, the program comprising sets of instructions for:

receiving, from the first sensor, a first set of sensor data that the first sensor detects from a first set of signal-transmitting devices;

receiving, from the second sensor, a second set of sensor data that the second sensor detects from a second set of signal-transmitting devices;

processing the first set of sensor data to determine a first set of potential locations and a corresponding first set of location metrics associated with the first set of potential locations;

processing the second set of sensor data to determine a second set of potential locations and a corresponding second set of location metrics associated with the second set of potential locations; and identifying a location from the first and second sets of potential locations as a location of the device based on the first and second sets of location metrics; and filtering the first and second sets of sensor data; and performing smoothing operations on the first and second sets of sensor data; and wherein the location metrics associated with the first set of potential locations are determined based on reference data associated with a plurality of reference locations.

2. The non-transitory machine-readable medium of claim 1, wherein the identified location has a location metric representing a closest distance to a reference location in the plurality reference locations.

3. The non-transitory machine-readable medium of claim 1, wherein identifying the location from the first and second sets of potential locations comprises determining a mode of the first and second sets of potential locations.

4. The non-transitory machine-readable medium of claim 1, wherein the program further comprises instructions for:

receiving, from a third sensor, a third set of sensor data that the third sensor detects from a third set of signal-transmitting devices; and processing the third set of sensor data to determine a third set of potential locations and a corresponding third set of location metrics associated with the third set of potential locations, wherein the identification comprises identifying the location from the first, second, and third sets of potential locations as the location of the device based on the first, second, and third sets of location metrics.

5. The non-transitory machine-readable medium of claim 1, wherein the program further comprises instructions for displaying the identified location on a display of the device.

6. For a device comprising a first sensor and a second sensor a method comprising:

receiving, from the first sensor, a first set of sensor data that the first sensor detects from a first set of signal-transmitting devices;

receiving, from the second sensor, a second set of sensor data that the second sensor detects from a second set of signal-transmitting devices;

processing the first set of sensor data to determine a first set of potential locations and a corresponding first set of location metrics associated with the first set of potential locations;

processing the second set of sensor data to determine a second set of potential locations and a corresponding second set of location metrics associated with the second set of potential locations; and identifying a location from the first and second sets of potential locations as a location of the device based on the first and second sets of location metrics; and filtering the first and second sets of sensor data; and performing smoothing operations on the first and second sets of sensor data; and wherein the location metrics associated with the first set of potential locations are determined based on reference data associated with a plurality of reference locations.

7. The method of claim 6, wherein the location metrics associated with the first set of potential locations are determined based on reference data associated with a plurality of reference locations.

8. The method of claim 7, wherein the identified location has a location metric representing a closest distance to a reference location in the plurality reference locations.

9. The method of claim 6, wherein identifying the location from the first and second sets of potential locations comprises determining a mode of the first and second sets of potential locations.

10. The method of claim 6 further comprising:

receiving, from a third sensor, a third set of sensor data that the third sensor detects from a third set of signal-transmitting devices; and processing the third set of sensor data to determine a third set of potential locations and a corresponding third set of location metrics associated with the third set of potential locations, wherein the identification comprises identifying the location from the first, second, and third sets of potential locations as the location of the device based on the first, second, and third sets of location metrics.

11. The method of claim 6, wherein the program further comprises instructions for displaying the identified location on a display of the device.

12. A system comprising:

a first sensor:

a second sensor a set of processing units; and a non-transitory computer-readable medium storing instructions that when executed by at least one processing unit in the set of processing units cause the at least one processing unit to:

receive, from—a the first sensor, a first set of sensor data that the first sensor detects from a first set of signal-transmitting devices;

receive, from—a the second sensor; a second set of sensor data that the second sensor detects from a second set of signal-transmitting devices;

process the first set of sensor data to determine a first set of potential locations and a corresponding first set of location metrics associated with the first set of potential locations;

process the second set of sensor data to determine a second set of potential locations and a corresponding second set of location metrics associated with the second set of potential locations; and identify a location from the first and second sets of potential locations as a location of the system based on the first and second sets of location metrics; and filter the first and second sets of sensor data; and perform smoothing operations on the first and second sets of sensor data; and wherein the location metrics associated with the first set of potential locations are determined based on reference data associated with a plurality of reference locations.

13. The system of claim 12, wherein the identified location has a location metric representing a closest distance to a reference location in the plurality reference locations.

14. The system of claim 12, wherein identifying the location from the first and second sets of potential locations comprises determining a mode of the first and second sets of potential locations.

15. The system of claim 12, wherein the instructions further cause the at least one processing unit to:

receive, from a third sensor, a third set of sensor data that the third sensor detects from a third set of signal-transmitting devices; and process the third set of sensor data to determine a third set of potential locations and a corresponding third set of location metrics associated with the third set of potential locations, wherein the identification comprises identifying the location from the first, second, and third sets of potential locations as the location of the system based on the first, second, and third sets of location metrics.

* * * * *